United States Patent
Krueger et al.

(10) Patent No.: US 11,408,911 B2
(45) Date of Patent: Aug. 9, 2022

(54) OPTOMECHANICAL STRUCTURE WITH CORRUGATED EDGE

(71) Applicant: Honeywell International Inc., Morris Plains, NJ (US)

(72) Inventors: Neil Krueger, Saint Paul, MN (US); Matthew Puckett, Phoenix, AZ (US); Chad Fertig, Bloomington, MN (US); Arthur Savchenko, Kirkland, WA (US); Steven Tin, Plymouth, MN (US); Joshua Dorr, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 203 days.

(21) Appl. No.: 16/514,905

(22) Filed: Jul. 17, 2019

(65) Prior Publication Data

US 2021/0018531 A1    Jan. 21, 2021

(51) Int. Cl.
*G01P 15/093* (2006.01)
*G01H 9/00* (2006.01)
(Continued)

(52) U.S. Cl.
CPC ............ *G01P 15/093* (2013.01); *G01H 9/00* (2013.01); *G01P 15/0802* (2013.01); *G01P 15/097* (2013.01); *G01P 2015/0814* (2013.01)

(58) Field of Classification Search
CPC .. G01P 15/097; G01P 15/093; G01P 15/0802; G01P 21/00
See application file for complete search history.

(56) References Cited

U.S. PATENT DOCUMENTS

| 3,499,331 A | 3/1970 | Miller |
|---|---|---|
| 4,233,847 A | 11/1980 | Walker |

(Continued)

FOREIGN PATENT DOCUMENTS

| CN | 107219378 A | 9/2017 |
|---|---|---|
| CN | 108519498 A | 9/2018 |

(Continued)

OTHER PUBLICATIONS

Response to Extended Search report dated Nov. 9, 2020, from counterpart European Application No. 20175109.6, filed Nov. 30, 2020, 20 pp.

(Continued)

*Primary Examiner* — Helen C Kwok
(74) *Attorney, Agent, or Firm* — Shumaker & Sieffert, P.A.

(57) ABSTRACT

This disclosure is related to devices, systems, and techniques for inducing mechanical vibration in one or more mechanical structures. For example, a system includes a mechanical structure extending along a longitudinal axis. The mechanical structure includes a set of mechanical beams, where the set of mechanical beams are configured to guide a modulated optical signal, and where the set of mechanical beams includes a first mechanical beam and a second mechanical beam separated by a gap. The first mechanical beam includes at least one of a first corrugated inner edge parallel to the longitudinal axis and a first corrugated outer edge parallel to the longitudinal axis. The second mechanical beam includes at least one of a second corrugated inner edge parallel to the longitudinal axis and a second corrugated outer edge parallel to the longitudinal axis.

20 Claims, 11 Drawing Sheets

(51) Int. Cl.
*G01P 15/08* (2006.01)
*G01P 15/097* (2006.01)

(56) References Cited

U.S. PATENT DOCUMENTS

| | | | |
|---|---|---|---|
| 4,345,482 A | 8/1982 | Adolfsson et al. | |
| 4,422,331 A | 12/1983 | Walker | |
| 4,428,234 A | 1/1984 | Walker | |
| 4,628,175 A | 12/1986 | Nissl | |
| 4,733,561 A | 3/1988 | Gilby | |
| 4,739,660 A | 4/1988 | Fima | |
| 4,897,541 A | 1/1990 | Philips | |
| 4,900,918 A | 2/1990 | Killian | |
| 5,013,909 A | 5/1991 | Sondergeld et al. | |
| 5,095,763 A | 3/1992 | Delatorre | |
| 5,109,693 A | 5/1992 | Hojo et al. | |
| 5,291,014 A | 3/1994 | Brede et al. | |
| 5,437,186 A * | 8/1995 | Tschulena | G01P 15/093 250/227.21 |
| 5,496,436 A | 3/1996 | Bernstein et al. | |
| 5,501,103 A | 3/1996 | Woodruff et al. | |
| 5,559,358 A | 9/1996 | Burns et al. | |
| 5,689,107 A | 11/1997 | Hsu | |
| 5,770,473 A | 6/1998 | Hall et al. | |
| 5,786,927 A | 7/1998 | Greywall | |
| 6,018,390 A | 1/2000 | Youmans et al. | |
| 6,182,509 B1 | 2/2001 | Leung | |
| 6,350,983 B1 | 2/2002 | Kaldor et al. | |
| 6,392,220 B1 * | 5/2002 | Slater | H04Q 11/0005 250/216 |
| 6,481,283 B1 | 11/2002 | Cardarelli | |
| 6,494,095 B1 | 12/2002 | Wan | |
| 6,510,737 B1 | 1/2003 | Hobbs et al. | |
| 6,546,798 B1 | 4/2003 | Waters et al. | |
| 6,594,061 B2 | 7/2003 | Huang et al. | |
| 6,745,627 B1 | 6/2004 | Woodruff et al. | |
| 6,763,723 B1 | 7/2004 | Zook et al. | |
| 6,789,053 B2 | 9/2004 | Collins | |
| 6,807,325 B1 | 10/2004 | Kraemmer et al. | |
| 6,874,363 B1 * | 4/2005 | Foote | G01P 15/097 73/514.29 |
| 6,911,765 B2 | 6/2005 | Kawashima | |
| 6,947,642 B2 | 9/2005 | Yamazaki | |
| 6,955,085 B2 | 10/2005 | Jones et al. | |
| 7,243,542 B2 | 7/2007 | Hulsing, II | |
| 7,427,522 B2 | 9/2008 | Morikawa et al. | |
| 7,573,924 B2 | 8/2009 | Tsuda et al. | |
| 7,612,887 B2 | 11/2009 | Choi | |
| 7,613,367 B2 | 11/2009 | Levy et al. | |
| 7,743,661 B2 | 6/2010 | Berthold et al. | |
| 7,808,618 B1 | 10/2010 | Tawney et al. | |
| 7,822,090 B2 | 10/2010 | Minamio et al. | |
| 7,881,565 B2 | 2/2011 | Kilic et al. | |
| 7,920,270 B2 | 4/2011 | Chow et al. | |
| 7,980,115 B2 | 7/2011 | Stewart et al. | |
| 8,159,736 B2 | 4/2012 | Maleki et al. | |
| 8,288,926 B2 | 10/2012 | Furuhata et al. | |
| 8,334,984 B2 | 12/2012 | Perez et al. | |
| 8,537,368 B2 | 9/2013 | Kilic et al. | |
| 8,677,821 B2 | 3/2014 | Ayazi et al. | |
| 8,726,732 B2 | 5/2014 | Littler et al. | |
| 8,875,578 B2 | 11/2014 | Smith | |
| 8,887,567 B2 | 11/2014 | Dwyer et al. | |
| 8,904,867 B2 | 12/2014 | Martin et al. | |
| 8,960,002 B2 | 2/2015 | Nasir et al. | |
| 9,069,004 B2 | 6/2015 | Bhave et al. | |
| 9,194,782 B2 | 11/2015 | Jeon et al. | |
| 9,207,081 B2 | 12/2015 | Geen | |
| 9,228,916 B2 | 1/2016 | Valdevit et al. | |
| 9,239,340 B2 | 1/2016 | Hutchinson et al. | |
| 9,261,525 B2 | 2/2016 | Thiruvenkatanathan et al. | |
| 9,335,271 B2 | 5/2016 | Pruessner et al. | |
| 9,417,260 B2 | 8/2016 | Bulatowicz | |
| 9,455,354 B2 | 9/2016 | Acar | |
| 9,618,531 B2 | 4/2017 | Painter et al. | |
| 9,753,055 B2 | 9/2017 | Paquet et al. | |
| 9,766,099 B2 | 9/2017 | Pechstedt | |
| 9,874,581 B2 | 1/2018 | Tin et al. | |
| 9,927,458 B2 | 3/2018 | Bramhavar et al. | |
| 9,983,225 B2 | 5/2018 | Fertig et al. | |
| 10,031,158 B1 | 7/2018 | Douglas et al. | |
| 10,079,467 B2 | 9/2018 | Guzman et al. | |
| 10,107,936 B2 | 11/2018 | Compton | |
| 10,126,321 B2 | 11/2018 | Zandi et al. | |
| 10,139,564 B1 | 11/2018 | Homeijer et al. | |
| 11,150,264 B2 * | 10/2021 | Krueger | B81B 3/0083 |
| 2001/0047688 A1 | 12/2001 | Woodruff et al. | |
| 2004/0129867 A1 | 7/2004 | Mackey | |
| 2012/0103099 A1 | 5/2012 | Stuke et al. | |
| 2013/0204573 A1 | 8/2013 | Kandler | |
| 2013/0298675 A1 | 11/2013 | Thiruvenkatanathan et al. | |
| 2014/0043614 A1 | 2/2014 | Dhayalan et al. | |
| 2014/0192061 A1 * | 7/2014 | Payne | B81C 1/00166 345/501 |
| 2015/0020590 A1 | 1/2015 | Painter et al. | |
| 2015/0323456 A1 * | 11/2015 | Agashe | G01N 21/01 356/445 |
| 2016/0139170 A1 | 5/2016 | Dwyer et al. | |
| 2016/0223329 A1 | 8/2016 | Zandi et al. | |
| 2016/0334440 A1 * | 11/2016 | Fertig | G01P 21/00 |
| 2016/0334441 A1 * | 11/2016 | Tin | G01P 21/00 |
| 2016/0349283 A1 | 12/2016 | Bramhavar et al. | |
| 2016/0377647 A1 * | 12/2016 | Fertig | G01P 15/097 73/1.38 |
| 2017/0057809 A1 | 3/2017 | Saint-Patrice et al. | |
| 2017/0089944 A1 | 3/2017 | Duraffourg | |
| 2017/0242050 A1 | 8/2017 | Pan et al. | |
| 2018/0003749 A1 | 1/2018 | Dogiamis et al. | |
| 2018/0128850 A1 | 5/2018 | Bramhavar et al. | |
| 2018/0172723 A1 | 6/2018 | Bramhavar et al. | |
| 2018/0246139 A1 | 8/2018 | Zotov et al. | |
| 2018/0267078 A1 | 9/2018 | Sato | |
| 2019/0049485 A1 | 2/2019 | Stewart et al. | |

FOREIGN PATENT DOCUMENTS

| | | |
|---|---|---|
| EP | 1310801 A1 | 5/2003 |
| EP | 3112879 A1 | 4/2017 |
| JP | H10327115 A | 12/1998 |
| WO | 0071981 A1 | 11/2000 |
| WO | 2008043737 A2 | 4/2008 |
| WO | 2015/080662 A1 | 6/2015 |
| WO | 2015080662 A1 | 6/2015 |
| WO | 2018197857 A1 | 11/2018 |

OTHER PUBLICATIONS

Beyazoglu, "Integrated MEMS Cavity Optomechanical Oscillators for Wireless and Optical Communications," Electrical Engineering and Computer Sciences University of California at Berkeley, Aug. 12, 2016, 130 pp.

Chen et al., "Optical Microfiber Technology for Current, Temperature, Acceleration, Acoustic, Humidity and Ultraviolet Light Sensing," Laser Physics and Photonic Devices Laboratories, School of Engineering, University of Austrailia, sensors, MDPI, Dec. 28, 2017, 25 pp.

Cohen et al., "High-Q microphotonic electro-optic modulator," Department of Electrical Engineering, University of Southern California, PERGAMON, Solid-State Electronics, vol. 45, Mar. 29, 2001, 13 pp.

Gerberding et al., "Optomechanical reference accelerometer," Metrologia, vol. 52, No. 5, Apr. 2015, 13 pp.

Grutter, "Optical Whispering-Gallery Mode Resonators for Applications in Optical Communication and Frequency Control," Electrical Engineering and Computer Sciences University of California at Berkeley, Dec. 20, 2013, 127 op.

Hutchison et al., "Z-Axis Optomechanical Accelerometer," IEEE 25th International Conference on Micro Electro Mechanical Systems (MEMS), Jan. 29 through Feb. 2, 2012, 5 pp.

Krause et al., "A high-resolution microchip optomechanical accelerometer," Nature Photonics, Oct. 14, 2012, 5 pp.

(56) References Cited

OTHER PUBLICATIONS

Krause et al., "Optical read out and feedback cooling of a nanostring optomechanical cavity," Laboratory of Applied Physics, California Institute of Technology, Jun. 3, 2015, 13 pp.
Lee et al., "Fabrication of a Micro-Opto-Mechanical Accelerometer Based on Intensity Modulation", Microsystems Technologies, vol. 10, Issue 2, Jan. 2004, 12 pp.
Li et al., "Characterization and Testing of a Micro-g Whispering Gallery Mode Optomechanical Accelerometer," Journal of Lightwave Technology, vol. 36, Issue 18, May 25, 2018, 8 pp.
Lu et al. "Optical Acceleration Measurement Method with Large Non-ambiguity Range and High Resolution via Synthetic Wavelength and Single Wavelength Superheterodyne Interferometry," MDPI, Sensors, vol. 18, Oct. 12, 2018, 11 pp.
Miao et al., "A microelectromechanically controlled cavity optomechanical sensing system," New Journal of Physics, Apr. 4, 2012, 17 pp.
Pruessner et al., "Integrated waveguide-BDR microcavity optomechanical system," Optical Society of America, Optics Express, vol. 19, No. 22, Oct. 24, 2011, 15 pp.
Schliesser et al., "High-sensitivity monitoring of micromechanical vibration using optical whispering gallery mode resonators," New Journal of Physics, vol. 10, Sep. 30, 2008, 25 pp.
Sheikhaleh et al., "An Optical MEMS Accelerometer Based on a Two-Dimensional Photonic Crystal Add-Drop Filter," EEE, Journal of Lightwave Technology, vol. 35, No. 14, Jul. 15, 2017, 6 pp.
U.S. Appl. No. 16/391,074, filed Apr. 22, 2019, by Dorr et al.
U.S. Appl. No. 16/391,114, filed Apr. 1, 2019, by Dorr et al.
U.S. Appl. No. 16/514,864, filed Jul. 17, 2019, by Krueger et al.
U.S. Appl. No. 16/371,657, filed Apr. 1, 2019, by Fertig et al.
U.S. Appl. No. 16/539,949, filed Aug. 13, 2019, by Krueger et al.
U.S. Appl. No. 16/539,974, filed Aug. 13, 2019, by Dorr et al.
U.S. Appl. No. 16/539,984, filed Aug. 13, 2019, by Krueger et al.
Williamson et al., "Dual-Carrier Floquet Circulator with Time-Modulated Optical Resonators," Microelectronics Research Center, American Chemical Society, ACS Photonics, vol. 5, Aug. 20, 2018, 9 pp.
Zhang et al., "Noise suppression of a micro-grating accelerometer based on the dual modulation method," OSA Publishing, Applied Optics, vol. 56, Issue 36, Apr. 2, 2019, 4 pp.
U.S. Appl. No. 16/371,762, filed Apr. 1, 2019, by Fertig et al.
Oudich et al., "Optomechanic interaction in a corrugated phoxonic nanobeam cavity," Physical Review B, Jun. 2014, 9 pp.
Yen et al., "Corrugated aluminum nitride energy harvesters for high energy conversion effectiveness," Journal of Micromechanics and Microengineering, vol. 21, No. 8, Jul. 2011, 3 pp.
Kavitha et al., "Study of squeeze film damping characteristics under different gas mediums in a capacitive MEMS accelerometer," The Brazilian Society of Mechanical Sciences and Engineering, Feb. 20, 2015, 12 pp.
Chiu et al., "Development and Characterization of a CMOS-MEMS Accelerometer With Differential LC-Tank Oscillators," Journal of Microelectromechanical Systems, vol. 22, No. 6, Dec. 2013, pp. 1285-1295.
Zhang et al., "A Compact Low-Power Oscillation Circuit for the High Performance Silicon Oscillating Accelerometer," MP Conference Proceedings 1890, 040068, Oct. 5, 2017, 7 pp.
Eichenfield et al., "A picogram and nanometer scale photonic crystal opto-mechanical cavity," Cornell University, arXiv:0812.2953v1, Dec. 16, 2008, 15 pp.
Grutter et al., "Si3N4 Nanobeam Optomechanical Crystals," IEEE Journal of Selected Topics in Quantum Electronics, vol. 21, No. 4, Jul.-Aug. 2015, 11 pp.
Extended Search Report from counterpart European Application No. 20175109.6, dated Nov. 9, 2020, 9 pp.
Communication pursuant to Article 94(3) EPC from counterpart European Application No. 20175109.6 dated Feb. 22, 2022, 3 pp.
Response to Communication pursuant to Article 94(3) EPC dated Feb. 22, 2022, from counterpart European Application No. 20175109.6, filed Jun. 14, 2022, 17 pp.

\* cited by examiner

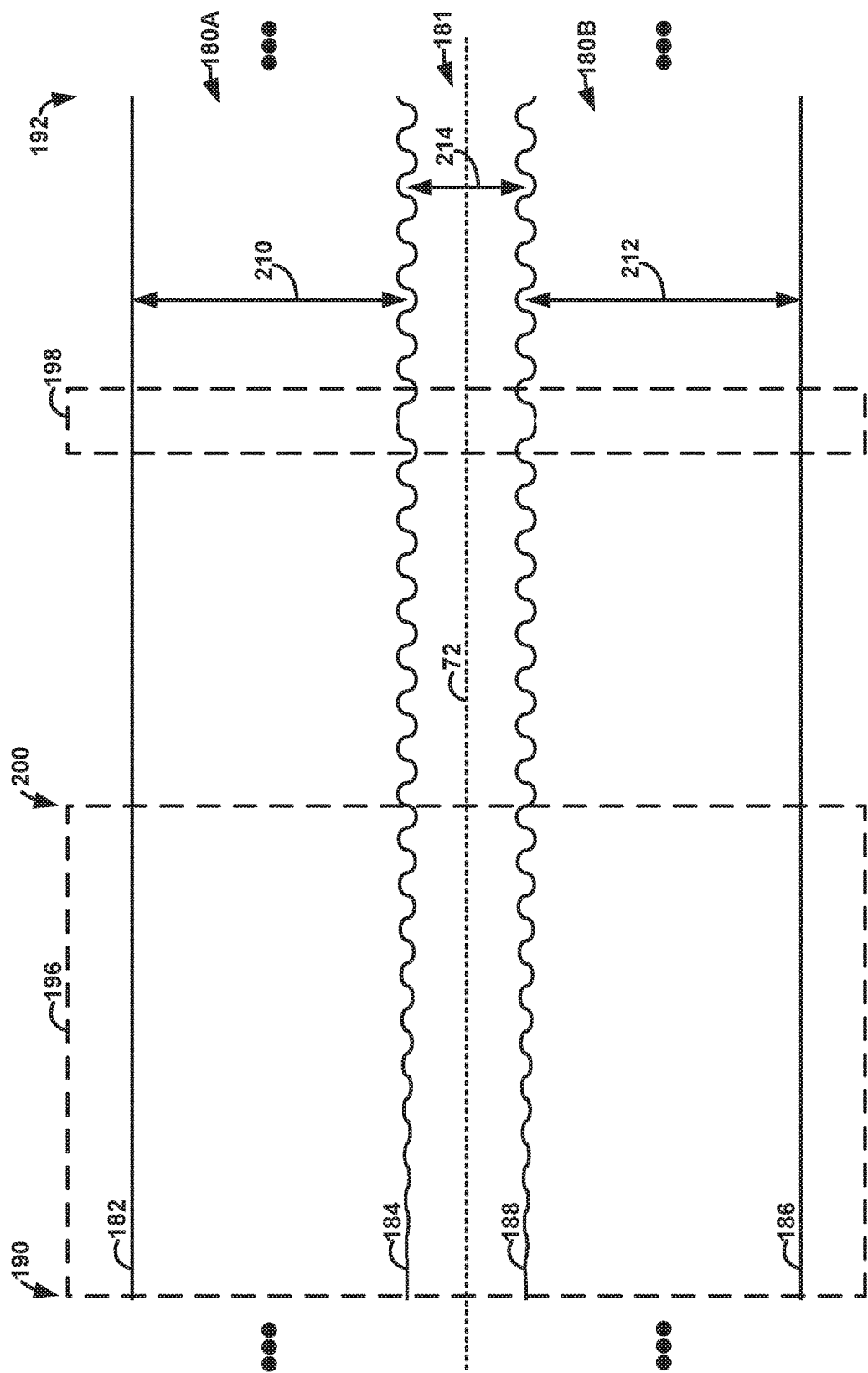

OPTOMECHANICAL STRUCTURE WITH CORRUGATED EDGE

STATEMENT REGARDING FEDERALLY SPONSORED RESEARCH OR DEVELOPMENT

This invention was made with Government support under N66001-16-C-4018 awarded by SPAWAR Systems Center Pacific. The Government has certain rights in the invention. This material is based upon work supported by the Defense Advanced Research Projects Agency (DARPA) and Space and Naval Warfare Systems Center Pacific (SSC Pacific).

TECHNICAL FIELD

This disclosure relates to optomechanical structures.

BACKGROUND

Inertial guidance systems use navigation grade accelerometers, such as Resonating Beam Accelerometers (RBAs). An RBA senses acceleration via stress-induced frequency shifts of vibrational modes of proof mass anchor beams. The beams may take the form of Double Ended Tuning Fork (DETF) structures.

SUMMARY

In general, the disclosure is directed to devices, systems and techniques for inducing mechanical vibration in one or more mechanical structures. More specifically, in one example implementation, the disclosure describes techniques for determining an acceleration of an object using an accelerometer system including a proof mass, where the proof mass is suspended within a structure (e.g., a frame) by the one or more mechanical structures configured to guide modulated optical signals. A mechanical structure may include a pair of mechanical beams separated by a gap. Each mechanical beam of the pair of beams may include at least one corrugated edge. The corrugated edges may cause an optical cavity to form in the gap between the pair of mechanical beams as a modulated optical signal is guided by the mechanical structure. The optical cavity induces mechanical vibration in the pair of mechanical beams. In some examples, a circuit receives the modulated optical signal that passes through the mechanical structure and determines an acceleration based on the modulated optical signal.

In some examples, a system includes a light-emitting device configured to emit an optical signal, a circuit including a modulating device configured to modulate the optical signal to produce a modulated optical signal, and a mechanical structure extending along a longitudinal axis, the mechanical structure including a set of mechanical beams, where the set of mechanical beams are configured to guide the modulated optical signal. The set of mechanical beams includes a first mechanical beam and a second mechanical beam separated by a gap, where the first mechanical beam includes at least one of a first corrugated inner edge parallel to the longitudinal axis and a first corrugated outer edge parallel to the longitudinal axis, and where the second mechanical beam includes at least one of a second corrugated inner edge parallel to the longitudinal axis and a second corrugated outer edge parallel to the longitudinal axis.

In some examples, a mechanical assembly includes a mechanical structure extending along a longitudinal axis, the mechanical structure including a set of mechanical beams, where the set of mechanical beams are configured to guide a modulated optical signal, where a circuit includes a modulating device configured to modulate an optical signal to produce the modulated optical signal, the optical signal emitted by a light-emitting device. The set of mechanical beams includes a first mechanical beam and a second mechanical beam separated by a gap, where the first mechanical beam includes at least one of a first corrugated inner edge parallel to the longitudinal axis and a first corrugated outer edge parallel to the longitudinal axis, and where the second mechanical beam includes at least one of a second corrugated inner edge parallel to the longitudinal axis and a second corrugated outer edge parallel to the longitudinal axis.

In some examples, a method includes emitting, using a light-emitting device, an optical signal, modulating, using a modulating device of a circuit, the optical signal to produce a modulated optical signal, and guiding, using a set of mechanical beams of a mechanical structure extending along a longitudinal axis, the modulated optical signal. The set of mechanical beams includes a first mechanical beam and a second mechanical beam separated by a gap, where the first mechanical beam includes at least one of a first corrugated inner edge parallel to the longitudinal axis and a first corrugated outer edge parallel to the longitudinal axis, and where the second mechanical beam includes at least one of a second corrugated inner edge parallel to the longitudinal axis and a second corrugated outer edge parallel to the longitudinal axis.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

FIG. 5C is a conceptual diagram of another example pair of mechanical beams, in accordance with one or more techniques of this disclosure.

Like reference characters denote like elements throughout the description and figures.

DETAILED DESCRIPTION

Figure 1:
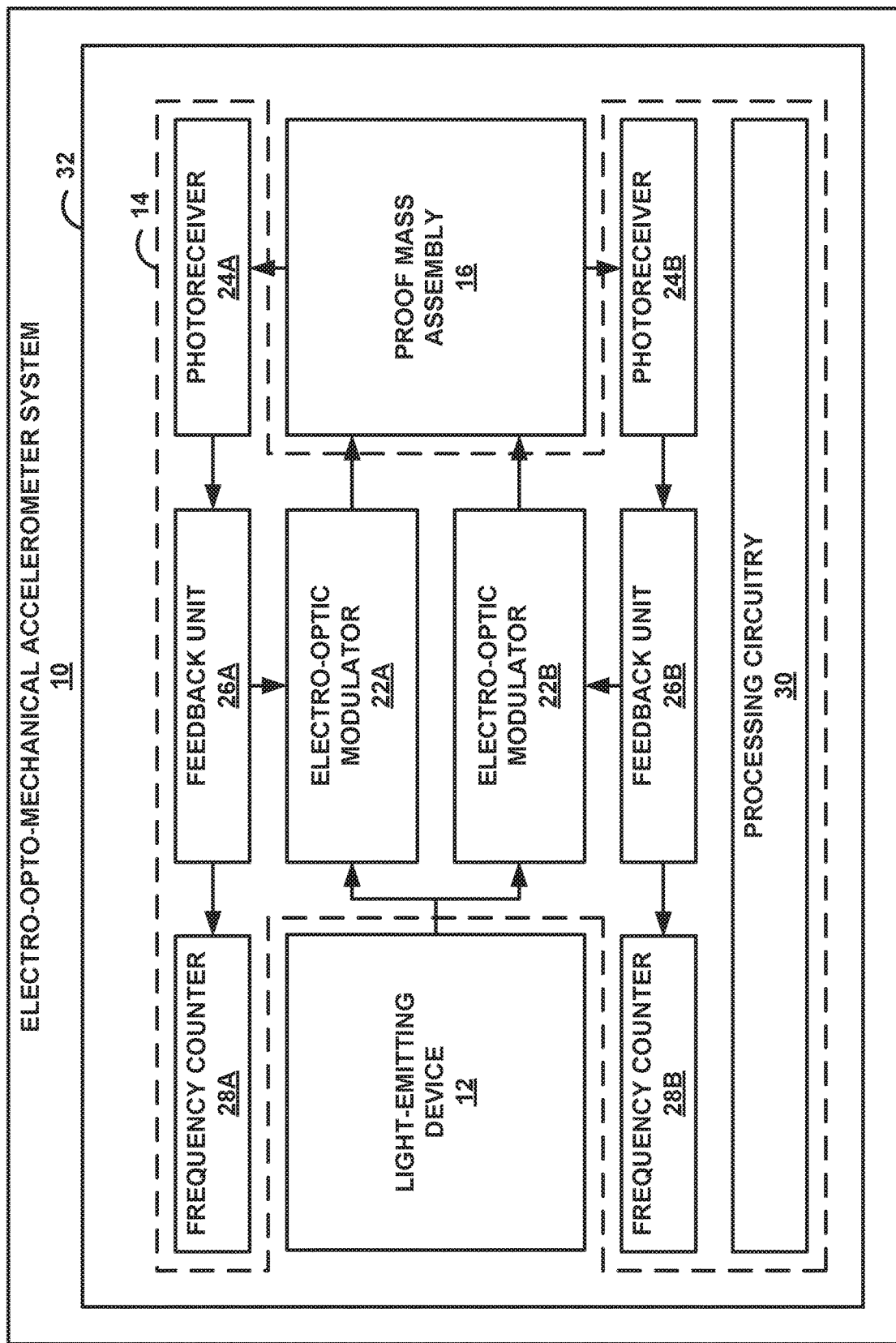
FIG. 1 is a block diagram illustrating an electro-optomechanical accelerometer system 10, in accordance with one or more techniques of this disclosure.

This disclosure is directed to devices, systems and techniques for inducing mechanical vibration in one or more mechanical structures (e.g., double ended tuning fork (DETF) structures). For example, a light-emitting device may emit an optical signal. A modulating device may modulate the optical signal to produce a modulated optical signal, and the modulating device may deliver the modulated optical signal to a DETF structure of the one or more DETF structures. The DETF structure may include two or more mechanical beams (e.g., a pair of waveguides separated by a gap) each including one or more corrugated edges. Additionally, the mechanical beams of the DETF structure may guide the modulated optical signal, thus acting as optical waveguides. As the mechanical beams guide the modulated optical signal, the respective corrugated edges of the mechanical beams may cause an optical cavity to form in the gap between the mechanical beams. The optical cavity, in some cases, may include energy that induces mechanical vibration in the mechanical beams of the DETF structure. In some examples, based on the mechanical vibration, an accelerometer system may be configured to determine an acceleration. Although techniques of this disclosure are described with respect to DETF structures, the techniques of this disclosure may be applied to induce mechanical vibration in any mechanical structure having one or more corrugated edges. Additionally, the techniques of this disclosure are not meant to be limited to an accelerometer system. For example, mechanical structures such as DETF structures may be used in a variety of applications, including electrical filters (e.g., high pass filters, low pass filters, and band pass filters), strain sensors, pressure sensors, force sensors, and gyroscopes, where the DETF structures have a coupled optical degree of freedom.

An accelerometer system may be an electro-opto-mechanical accelerometer system configured to precisely measure very high acceleration values (e.g., up to 500,000 meters per second squared (m/s$^2$)) of an object. The electro-opto-mechanical accelerometer system uses a combination of electrical signals, optical signals, and mechanical signals to determine the acceleration of the object. In some cases, the accelerometer system is configured to measure the acceleration of the object in real-time or near real-time, such that processing circuitry may analyze the acceleration of the object over a period of time to determine a positional displacement of the object during the period of time. For example, the accelerometer system may be a part of an inertial navigation system (INS) for tracking a position of an object based, at least in part, on an acceleration of the object. Additionally, the accelerometer system may be located on or within the object such that the accelerometer system accelerates with the object. As such, when the object accelerates, the acceleration system (including the proof mass) accelerates with the object. Since acceleration over time is a derivative of velocity over time, and velocity over time is a derivative of position over time, processing circuitry may, in some cases, be configured to determine the position displacement of the object by performing a double integral of the acceleration of the object over the period of time. Determining a position of an object using the accelerometer system located on the object—and not using on a navigation system separate from the object (e.g., a Global Positioning System (GPS))—may be referred to as "dead reckoning."

In order to more accurately track the position of the object using the INS, it may be beneficial to improve a quality of acceleration values determined by the accelerometer system. For example, it may be beneficial to achieve high levels of sensitivity in the accelerometer system in order to improve the accuracy of the acceleration values. High sensitivity may enable the accelerometer system to detect very small acceleration values, detect a very small change in acceleration values, detect a large range of acceleration values, or any combination thereof. Additionally, it may be beneficial to accurately determine the acceleration of the object while the object is experiencing high levels of acceleration. In this way, the accelerometer system may enable an INS to accurately track the position of the object while a magnitude of the acceleration of the object is very high.

The accelerometer system may, in some examples, include a micro-electro-mechanical system (MEMS) accelerometer which includes a light-emitting device, a circuit, and a proof mass assembly which includes a proof mass suspended within a frame by one or more double-ended tuning fork (DETF) structures. The DETF structures may be configured to guide optical signals. Additionally, optical signals may induce mechanical vibration in the DETF structures. In some cases, acceleration causes a displacement of the proof mass relative to the frame, the displacement affecting mechanical vibration frequencies (e.g., mechanical resonance frequencies) corresponding to the DETF structures. In this way, a mathematical relationship may exist between acceleration and the mechanical vibration frequencies of the DETF structures. As such, the mathematical relationship may be leveraged to determine acceleration. The accelerometer system uses, in some examples, a combination of optical signals and electrical signals to measure the mechanical vibration frequencies corresponding to the DETF structures and calculate acceleration based on the mechanical vibration frequencies.

For example, the circuit is configured to modulate, using a modulating device, an optical signal emitted by the light-emitting device. The modulated optical signal propagates through a DETF structure of the proof mass assembly, inducing mechanical vibration in the DETF structure. Additionally, the mechanical vibration further modulates the modulated optical signal such that the mechanical vibration frequency of the DETF structure is reflected in the modulated optical signal after the modulated optical signal passes through the DETF structure. The modulated optical signal arrives at a photoreceiver, which converts the modulated optical signal into an electrical signal. Additionally, the photoreceiver may preserve properties of the modulated optical signal when creating the electrical signal (e.g., preserve the mechanical vibrating frequency of the DETF structure). In this way, the circuit may process the electrical signal and analyze the processed electrical signal to determine the mechanical vibrating frequency of the DETF structure. Based on the mechanical vibrating frequency, processing circuitry may determine the acceleration of the object carrying the accelerometer system.

In some examples, the proof mass assembly further includes one or more tethers which contribute to the suspension of the proof mass. For example, the proof mass may be suspended in a first direction within the frame by the DETF structures. Additionally, the proof mass may be suspended in a second direction and a third direction by one or more tethers. In some cases, the one or more tethers prevent the proof mass from being displaced in the second direction and the third direction, but the DETF structures allow the proof mass to be displaced in the first direction. The first direction, the second direction, and the third direction may represent three axes (e.g., x-axis, y-axis, and z-axis) of a three-dimensional Cartesian space. In this way, the proof mass assembly, in some cases, may only allow the proof mass to displace along a single proof mass displacement axis, thus enabling the accelerometer system to measure the acceleration relative to the proof mass displacement axis. In some cases, to obtain an acceleration relative to all three Cartesian axes, three accelerometer systems are implemented such that the proof mass displacement axes of the respective accelerometer systems are aligned to form an x-axis, a y-axis, and a z-axis of a Cartesian space.

The accelerometer system may employ a positive feedback loop to simplify a manner in which the acceleration of the object is measured. For example, the circuit may direct the processed electric signal to the EOM, which modulates the optical signal emitted by the light-emitting device based on the processed electrical signal. In this way, the optical signal input to the proof mass assembly depends, at least in part, on the optical signal output from the proof mass assembly to the circuit. By using the positive feedback loop, the accelerometer system may improve an efficiency in which the circuit calculates the acceleration (e.g., decreases a number of steps required to calculate the acceleration). For example, to calculate the acceleration value, processing circuitry may subtract a baseline frequency value from the mechanical vibration frequency of the DETF structure to obtain a frequency difference value. The baseline frequency value may, in some cases, represent a mechanical vibration frequency of the DETF structure while the proof mass is not displaced along the proof mass displacement axis (i.e., acceleration is 0 m/s$^2$). In some examples, the frequency difference value is correlated with acceleration, enabling the processing circuitry to use the correlation to determine acceleration based on the frequency difference value. As such, the positive feedback loop may ensure that a small number of calculation steps is required to determine acceleration.

Corrugated edges of the mechanical beams of the DETF structure may effectively cause an optical cavity to form between the mechanical beams, thus inducing mechanical vibration in the mechanical beams. In some cases, a DETF structure in which the mechanical beams include corrugated edges may cause an optical cavity to form as effectively, or more effectively, than a DETF structure in which holes are present in the center of the mechanical beams and the edges of the mechanical beams are not corrugated. Additionally, the DETF structure in which the mechanical beams include corrugated edges may be easier to manufacture than the DETF structure in which holes are present in the center of the mechanical beams and the edges of the mechanical beams are not corrugated. In this way, it may be beneficial to incorporate a corrugated edge design in the accelerometer system which includes DETF structures suspending a proof mass in a frame.

FIG. 1 is a block diagram illustrating an electro-opto-mechanical accelerometer system 10, in accordance with one or more techniques of this disclosure. As illustrated in FIG. 1, accelerometer system 10 includes light-emitting device 12, circuit 14, proof mass assembly 16, and housing 32. Additionally, in the example illustrated in FIG. 1, circuit 14 includes electro-optic-modulators (EOM) 22A, 22B (collectively, "EOMs 22"), photoreceivers 24A, 24B (collectively, "photoreceivers 24"), feedback units 26A, 26B (collectively, "feedback units 26"), frequency counters 28A, 28B (collectively, "frequency counters 28"), and processing circuitry 30. In the example of FIG. 1, light-emitting device 12, proof mass assembly 16, EOM 22A, photoreceiver 24A, feedback unit 26A, and frequency counter 28A form a first positive feedback loop. Additionally, in the example of FIG. 1, light-emitting device 12, proof mass assembly 16, EOM 22B, photoreceiver 24B, feedback unit 26B, and frequency counter 28B form a second positive feedback loop.

Accelerometer system 10 may, in some examples, be configured to determine an acceleration associated with an object (not illustrated in FIG. 1) based on a measured mechanical vibration frequency of a set of double-ended tuning fork (DETF) structures which suspend a proof mass of proof mass assembly 16, where the mechanical vibration of the DETF structures is induced by an optical signal emitted by light-emitting device 12. In some examples, the first positive feedback loop generates a first frequency value representing a vibration frequency of a first DETF structure of the set of DETF structures and the second positive feedback loop generates a second frequency value representing a vibration frequency of a second DETF structure of the set of DETF structures. Based on the first vibration frequency and the second vibration frequency, accelerometer system 10 may determine a first acceleration value and a second acceleration value, respectively. In some examples, accelerometer system 10 determines an acceleration of an object based on the first acceleration value and the second acceleration value. In some examples, accelerometer system 10 determines the acceleration of the object based on the first acceleration value. In some examples, accelerometer system 10 determines the acceleration of the object based on the second acceleration value.

Additionally, in some cases, accelerometer system 10 may determine a difference between the first frequency value and the second frequency value and/or determine a difference between the first acceleration value and the second acceleration value. By determining the difference between the respective frequency and/or acceleration values identified using the first positive feedback loop and the second positive feedback loop, accelerometer system 10 may reject one or more common mode errors present in the respective frequency and/or acceleration values.

Light-emitting device 12 may, in some cases, include a laser device configured to emit photons. In some examples, light-emitting device 12 emits the photons at an optical power within a range between 0.1 microwatts (µW) and 10 µW. In some examples, light-emitting device 12 is a semiconductor laser which includes a laser diode.

In some examples, circuit 14 may include a set of electrical components for processing and analyzing electrical signals received by photoreceivers 24. Components of circuit 14 are described in further detail below.

EOMs 22 may represent optical devices configured to modulate, based on electrical signals produced and processed by circuit 14, an optical signal emitted by light-emitting device 12. EOM 22A, for example, may include a set of crystals (e.g., Lithium Niobate crystals), where a refractive index of the set of crystals changes as a function of an electric field proximate to the set of crystals. The refractive index of the crystals may determine a manner in which EOM 22A modulates the optical signal. For example, the crystals of EOM 22A may receive the optical signal from light-emitting device 12 while EOM 22A is also receiving an electrical signal from feedback unit 26A of circuit 14. As such, the electrical signal may affect the electric field proximate to the crystals of EOM 22A, thus causing EOM 22A to modulate the optical signal. In some examples, EOM 22A modulates the optical signal by modulating the refractive index of the crystals using the electrical signal. EOM 22A, in some cases, may transmit the modulated optical signal to proof mass assembly 16. In some examples, EOM 22B is substantially similar to EOM 22A, with EOM 22B controlled by an electrical signal from feedback unit 26B.

In general, photoreceivers 24 may each include one or more transistors configured to absorb photons of an optical signal and output, in response to absorbing the photons, an electrical signal. In this manner, photoreceivers 24 may be configured to convert optical signals into electrical signals. Photoreceiver 24A, for example, may include a p-n junction that converts the photons of the optical signal into the electrical signal, where the electrical signal preserves at least some parameters of the optical signal. One or more frequency values and intensity values associated with the optical signal may be reflected in the electrical signal produced by photoreceiver 24A in response to photoreceiver 24A receiving the optical signal. For example, photoreceiver 24A may produce a stronger electrical signal (i.e., greater current magnitude) in response to receiving a stronger (e.g., greater power) optical signal. Additionally, in some cases, photoreceiver 24A may produce the electrical signal to reflect the one or more frequency values corresponding to the received optical signal. In other words, processing circuitry (e.g., processing circuitry 30) may analyze the electrical signal to determine the one or more frequency values corresponding to the optical signal. Photoreceiver 24A may include semiconductor materials such as any combination of Indium Gallium Arsenide, Silicon, Silicon Carbide, Silicon Nitride, Gallium Nitride, Germanium, or Lead Sulphide. In some examples, photoreceiver 24B is substantially similar to photoreceiver 24A.

Feedback units 26 may each include a set of circuit components for processing electrical signals. In some examples, the set of circuit components included in feedback unit 26A may include any combination of a band pass filter, a phase shifter, an electronic amplifier, and a voltage limiter. Such components may process, or filter, the electrical signal such that certain aspects of the electrical signal may be more efficiently measured (e.g., frequency values or intensity values). In the example of FIG. 1, feedback unit 26A may receive an electrical signal from photoreceiver 24A and output a processed electrical signal to EOM 22A and frequency counter 28A. In this way, feedback unit 26A acts as a part of a first positive feedback loop by processing an electrical signal which EOM 22A uses to modulate an optical signal emitted by light-emitting device 12, where the modulated optical signal passes through proof mass assembly 16 before arriving back at circuit 14 for processing by feedback unit 26A. Feedback unit 26B may be substantially similar to feedback unit 26A in that feedback unit 26B receives an electrical signal from photoreceiver 24B, and delivers a processed electrical signal to frequency counter 28B and EOM 22B. As such, feedback unit 26B operates within a second feedback loop in a similar manner to which feedback unit 26A operates within the first feedback loop.

In some examples, frequency counters 28 are circuit components that are each configured for measuring a frequency of an electrical signal. For example, frequency counter 28A may determine one or more frequency values corresponding to the processed electrical signal produced by feedback unit 26A. Frequency counter 28A may measure frequency values corresponding to the processed electrical signal in real-time or near real-time, such that frequency counter 28A tracks the frequency values as a function of time. Frequency counter 28B may be substantially similar to frequency counter 28A, except frequency counter 28B receives an electrical signal from feedback unit 26B rather than from feedback unit 26A.

Processing circuitry 30, and circuit 14 generally, may include one or more processors that are configured to implement functionality and/or process instructions for execution within accelerometer system 10. For example, processing circuitry 30 may be capable of processing instructions stored in a storage device (not illustrated in FIG. 1). Processing circuitry 30 may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, processing circuitry 30 may include any suitable structure, whether in hardware, software, firmware, or any combination thereof, to perform the functions ascribed herein to processing circuitry 30.

Proof mass assembly 16 may include a proof mass, a frame, a set of tethers, and a set of DETF structures. The proof mass, in some examples, is suspended within the frame by the set of tethers and the set of DETF structures. For example, the set of DETF structures may suspend the proof mass in a first direction relative to the frame. Additionally, the set of tethers may suspend the proof mass in a second direction and a third direction relative to the frame. The first direction, the second direction, and the third direction may represent three axes (e.g., x-axis, y-axis, and z-axis) of a Cartesian space. In some cases, the set of DETF structures enable the proof mass to be displaced in the first direction. Additionally, in some cases, the set of tethers prevent the proof mass from being displaced in the second direction and the third direction. In this way, proof mass assembly 16 may only allow the proof mass to be displaced along a single axis (e.g., a displacement axis). Since the displacement of the proof mass may determine the acceleration measured by circuit 14, accelerometer system 10 may be configured to determine the acceleration relative to the displacement axis.

The set of DETF structures may, in some cases, include the first DETF structure and the second DETF structure. The first DETF structure may include a first mechanical beam and a second mechanical beam separated by a first gap. In some examples, the first mechanical beam includes at least one of a first corrugated inner edge parallel to the longitudinal axis and a first corrugated outer edge parallel to the longitudinal axis. Additionally, in some examples, the second mechanical beam includes at least one of a second corrugated inner edge parallel to the longitudinal axis and a second corrugated outer edge parallel to the longitudinal axis. The first mechanical beam and the second mechanical beam may, in some cases, guide optical signals. In this way, the first mechanical beam and the second mechanical beam may act as optical waveguides for transporting optical signals. The corrugated edges of the mechanical beams may cause an optical cavity to form in the first gap between the first mechanical beam and the second mechanical beam as optical signals pass through the first DETF structure. For example, each of the corrugated edges may represent a periodic pattern having one or more defects, the one or more defects in each corrugated edge causing the optical cavity to form, localizing optical energy in the first gap between the first mechanical beam and the second mechanical beam. The corrugated edges may serve to generate optical "bandgaps" through periodic perturbations of the optical signal. In other words, the corrugated edges may behave as mirrors for specific bands of optical frequencies. A defect in a corrugated edge may represent a break in the optical bandgap, the break giving rise to the optical cavity with localized optical energy in the first gap. The optical cavity and its confined optical energy may induce mechanical vibration in the first mechanical beam and the second mechanical beam.

In some examples, the first mechanical beam includes the first corrugated inner edge and a first straight outer edge parallel to the longitudinal axis, and the second mechanical beam includes the second corrugated inner edge and a second straight outer edge parallel to the longitudinal axis. In such examples, the first gap between the first mechanical beam and the second mechanical beam may be bounded by the first corrugated inner edge and the second corrugated inner edge. In some examples, the first mechanical beam includes a first straight inner edge parallel to the longitudinal axis and the first corrugated outer edge, and the second mechanical beam includes a second straight inner edge parallel to the longitudinal axis and the second corrugated outer edge. Additionally, in some examples, the first mechanical beam includes the first corrugated inner edge and the first corrugated outer edge, and where the second mechanical beam includes the second corrugated inner edge and the second corrugated outer edge.

The second DETF structure may include a third mechanical beam and a fourth mechanical beam separated by a second gap. In some examples, the third mechanical beam includes at least one of a third corrugated inner edge parallel to the longitudinal axis and a third corrugated outer edge parallel to the longitudinal axis. Additionally, in some examples, the fourth mechanical beam includes at least one of a fourth corrugated inner edge parallel to the longitudinal axis and a fourth corrugated outer edge parallel to the longitudinal axis. The third mechanical beam and the fourth mechanical beam may, in some cases, guide optical signals. In this way, the third mechanical beam and the fourth mechanical beam may act as optical waveguides for transporting optical signals. The corrugated edges of the mechanical beams may cause an optical cavity to form in the second gap between the third mechanical beam and the fourth mechanical beam as optical signals pass through the second DETF structure. For example, each of the corrugated edges may represent a periodic pattern having one or more defects, the one or more defects in each corrugated edge causing the optical cavity to form, localizing optical energy in the second gap between the third mechanical beam and the fourth mechanical beam. The corrugated edges may serve to generate optical "bandgaps" through periodic perturbations of the optical signal. In other words, the corrugated edges may behave as mirrors for specific bands of optical frequencies. A defect in a corrugated edge may represent a break in the optical bandgap, the break giving rise to the optical cavity with localized optical energy in the second gap. The optical cavity and its confined optical cavity may induce mechanical vibration in the third mechanical beam and the fourth mechanical beam.

In some examples, the third mechanical beam includes the third corrugated inner edge and a third straight outer edge parallel to the longitudinal axis, and the fourth mechanical beam includes the fourth corrugated inner edge and a fourth straight outer edge parallel to the longitudinal axis. In such examples, the second gap between the third mechanical beam and the fourth mechanical beam may be bounded by the third corrugated inner edge and the fourth corrugated inner edge. In some examples, the third mechanical beam includes a third straight inner edge parallel to the longitudinal axis and the third corrugated outer edge, and the fourth mechanical beam includes a fourth straight inner edge parallel to the longitudinal axis and the fourth corrugated outer edge. Additionally, in some examples, the third mechanical beam includes the third corrugated inner edge and the third corrugated outer edge, and where the fourth mechanical beam includes the fourth corrugated inner edge and the fourth corrugated outer edge.

In some examples, the first positive feedback loop (e.g., device 12, proof mass assembly 16, EOM 22A, photoreceiver 24A, feedback unit 26A, and frequency counter 28A) and the second positive feedback loop (e.g., light-emitting device 12, proof mass assembly 16, EOM 22B, photoreceiver 24B, feedback unit 26B, and frequency counter 28B) are configured to independently determine an acceleration value representative of an acceleration of an object including accelerometer system 10. For example, light-emitting device 12 may emit an optical signal, EOM 22A may modulate the optical signal to produce a first modulated optical signal, and EOM 22A may transmit the first modulated optical signal to proof mass assembly 16. Photoreceiver 24A may receive the first modulated optical signal from proof mass assembly 16, where properties of the first modulated optical signal received by photoreceiver 24A may be affected by mechanical vibrations of a first DETF structure of proof mass assembly 16. Photoreceiver 24A converts the first modulated optical signal into a first electrical signal and transmits the first electrical signal to feedback unit 26A. In some examples, feedback unit 26A processes the first electrical signal to obtain a first processed electrical signal. For example, feedback unit 26A may use any combination of a first band pass filter, a first phase shifter, a first electronic amplifier, and a first voltage limiter to process the first electrical signal. Frequency counter 28A may receive the first processed electrical signal and determine a first frequency value corresponding to the first processed electrical signal. In some cases, the first frequency value represents a mechanical vibration frequency of the first DETF structure of proof mass assembly 16, which guides the first modulated optical signal ultimately received by photoreceiver 24A.

In addition to transmitting the first processed electrical signal to frequency counter 28A, feedback unit 26A may transmit the first processed electrical signal to EOM 22A. In turn, EOM 22A may modulate the optical signal emitted by light-emitting device 12 based on the first processed electrical signal, where the first modulated optical signal is transmitted to photoreceiver 24A via the first DETF structure of proof mass assembly 16, thus completing the first positive feedback loop. As such, a future mechanical vibration frequency of the first DETF structure depends, at least in part, on a current mechanical vibration frequency of the first DETF structure. The first modulated optical signal may, in some cases, induce mechanical vibration in the first DETF structure more efficiently than an unmodulated optical signal. In this way, EOM 22A may improve an operating efficiency of accelerometer system 10.

Additionally, in some examples, the second positive feedback loop may determine a second frequency value. For example, light-emitting device 12 may emit an optical signal, EOM 22B may modulate the optical signal to obtain a second modulated optical signal, and EOM 22B may transmit the second modulated optical signal to proof mass assembly 16. Photoreceiver 24B may receive the second modulated optical signal from proof mass assembly 16, where properties of the second modulated optical signal received by photoreceiver 24B may be affected by mechanical vibrations of a second DETF structure of proof mass assembly 16. Photoreceiver 24B converts the second modulated optical signal into a second electrical signal and transmits the second electrical signal to feedback unit 26B. In some examples, feedback unit 26B processes the second electrical signal to obtain a second processed electrical signal. For example, feedback unit 26B may use any combination of a second band pass filter, a second phase shifter, a second electronic amplifier, and a second voltage limiter to process the second electrical signal. Frequency counter 28B may receive the second processed electrical signal and determine a second frequency value corresponding to the second processed electrical signal. In some cases, the second frequency value represents a mechanical vibration frequency of the second DETF structure of proof mass assembly 16, which guides the second modulated optical signal ultimately received by photoreceiver 24B.

In addition to transmitting the second processed electrical signal to frequency counter 28B, feedback unit 26B may transmit the second processed electrical signal to EOM 22B. In turn, EOM 22B may modulate the optical signal emitted by light-emitting device 12 based on the second processed electrical signal, where the second modulated optical signal is transmitted to photoreceiver 24B via the second DETF structure of proof mass assembly 16, thus completing the second positive feedback loop. As such, a future mechanical vibration frequency of the second DETF structure depends, at least in part, on a current mechanical vibration frequency of the second DETF structure. The second modulated optical signal may, in some cases, induce mechanical vibration in the second DETF structure more efficiently than an unmodulated optical signal. In this way, EOM 22B may improve an operating efficiency of accelerometer system 10.

Processing circuitry 30 may be configured to calculate, based on the first frequency value, a first acceleration value. In some examples, to calculate the first acceleration value, processing circuitry 30 may subtract a baseline frequency value from the first frequency value to obtain a first frequency difference value. The baseline frequency value may represent a resonant mechanical frequency of the first DETF structure of proof mass assembly 16 while the proof mass is not displaced from a resting point along the proof mass displacement axis. In other words, the modulated optical signal emitted by EOM 22A may induce the first DETF structure to vibrate at the baseline frequency value while the proof mass is not displaced from the resting point along the proof mass displacement axis. As such, when the object is not accelerating, the first frequency difference value may be equal to zero since the first acceleration value—which represents the mechanical frequency of the first DETF structure—is equal to the baseline frequency value when the proof mass is not displaced (i.e., the object carrying accelerometer system 10 is not accelerating). The first frequency difference value, in some examples, may be correlated with an acceleration of the object. In other words, an increase of a magnitude of the first frequency difference value may indicate an increase in the acceleration of the object and a decrease of a magnitude of the first frequency difference value may indicate decrease in the acceleration of the object.

Additionally, processing circuitry 30 may be configured to calculate a second acceleration value based on the second acceleration value. In some examples, to calculate the second acceleration value, processing circuitry 30 may subtract a baseline frequency value from the second frequency value to obtain a second frequency difference value. The second frequency difference value, in some examples, may be correlated with an acceleration of the object. In other words, an increase of a magnitude of the second frequency difference value may indicate an increase in the acceleration of the object and a decrease of a magnitude of the second frequency difference value may indicate decrease in the acceleration of the object. The first acceleration value and the second acceleration value, which are calculated by processing circuitry 30, may, in some cases, be approximately equal.

It may be desirable for accelerometer system 10 to possess a high sensitivity in order to improve a quality of the acceleration values measured by accelerometer system 10 and/or increase a range of acceleration values in which accelerometer system 10 can accurately determine. To increase a level of sensitivity in accelerometer system 10, it may be beneficial to increase a mechanical quality factor of the DETF structures of proof mass assembly 16 (i.e., decrease an amount of damping which occurs while the DETF structures vibrate), increase a power of the optical signal emitted by light-emitting device 12, or any combination thereof. One way to increase the mechanical quality factor of the DETF structures is to decrease a pressure within a space in which the DETF structures are located. More specifically, to achieve a high mechanical quality factor, it may be beneficial to house the DETF structures in a vacuum or a near-vacuum environment. However, in some cases, housing the DETF structures in a vacuum or a near-vacuum environment while increasing the power of the optical signal emitted by light-emitting device 12 may cause components of accelerometer system 10 to heat up, and the optical signal may exhibit frequency nonlinearities caused by thermal effects—not by acceleration. Such nonlinearities may cause distortions in the accelerometer data which may be referred to as optical "shark fin" distortions, and the distortions may negatively affect the accuracy of the accelerometer data.

In some examples, housing 32 encloses light-emitting device 12, circuit 14, and proof mass assembly 16. Housing 32, in some examples, includes a crystalline material such as Silicon. Additionally, in some examples, housing 32 includes a first layer including an amorphous solid material and a second layer including a crystalline material.

In some examples, a mechanical quality factor associated with the DETF structures is within a range between 5,000 and 2,000,000. In some examples, light-emitting device 12 emits the optical signal at a power value within a range between 1 nanowatt (nW) and 10,000 nW.

In some examples, accelerometer system 10 includes an opto-mechanical vibrating beam accelerometer as a self-oscillating electro-opto-mechanical oscillator. Two pairs of nanoscale dielectric beams may form a pair of DETF structures that rigidly anchor a thin film proof mass to a frame. Each DETF structure of the pair of DETF structures may have an optical resonance with a spectral width within a range bounded inclusively by 0.05 nanometers (nm) and 1 nm (e.g., 0.1 nm). In some examples, the DETF structures may be excited and driven by the optical signal emitted by light-emitting device 12, where the optical signal is coupled into an optically active portion of the DETF structures via a waveguide. For example, one or more corrugated edges of mechanical beams of the DETF structures may cause optical cavities to form proximate to the respective DETF structures as optical signals pass through the DETF structures. In turn, the optical cavities may induce mechanical vibration in the respective DETF structures. Mechanical motion (e.g., mechanical vibration) of the DETF structures, driven by the amplitude-modulated optical signal, may have a reciprocal effect on the optical signal in that the mechanical motion modulates the optical signal. In other words, an optical signal may both induce mechanical vibration in the DETF structures and measure a mechanical vibration frequency of the DETF structures corresponding to the vibration caused by the optical signal.

The optical signal may be outcoupled from the DETF structures. In some examples, the laser field is reflected out of the DETF structures. In other examples, the optical signal passes through the DETF structures in transmission and the optical signal is incident on photoreceivers 24 with suitable bandwidth to detect an Alternating Current (AC) photocurrent at the modulation frequency of the optical signal. The electrical signals produced by photoreceivers 24 are conditioned by the feedback electronics (e.g., filtered, amplified, phase shifted, and voltage limited) and the electrical signals are output to respective drive ports of EOMs 22 to modulate the optical signal. In this way, accelerometer system 10 may realize closed loop electro-opto-mechanical self-oscillation at a mechanical resonance frequency (e.g., 1.33 megahertz (MHz)) under standard conditions of positive feedback with 0 degrees phase shift and 0 dB round-trip signal gain. Accelerations experienced by accelerometer system 10 may cause minute displacements of the proof mass of proof mass assembly 16, generating stresses in the DETF structures which shift mechanical resonance frequencies of the DETF structures—higher for tensile stresses, lower for compressive stresses. As such, an instantaneous frequency of each DETF structure may be monitored by counting the frequency of a respective electrical signal using a frequency counters 28. To generate an acceleration value, processing circuitry 30 may, in some examples, apply scale factors to measured frequency shifts in mechanical vibrating frequencies of the DETF structures.

Figure 2:
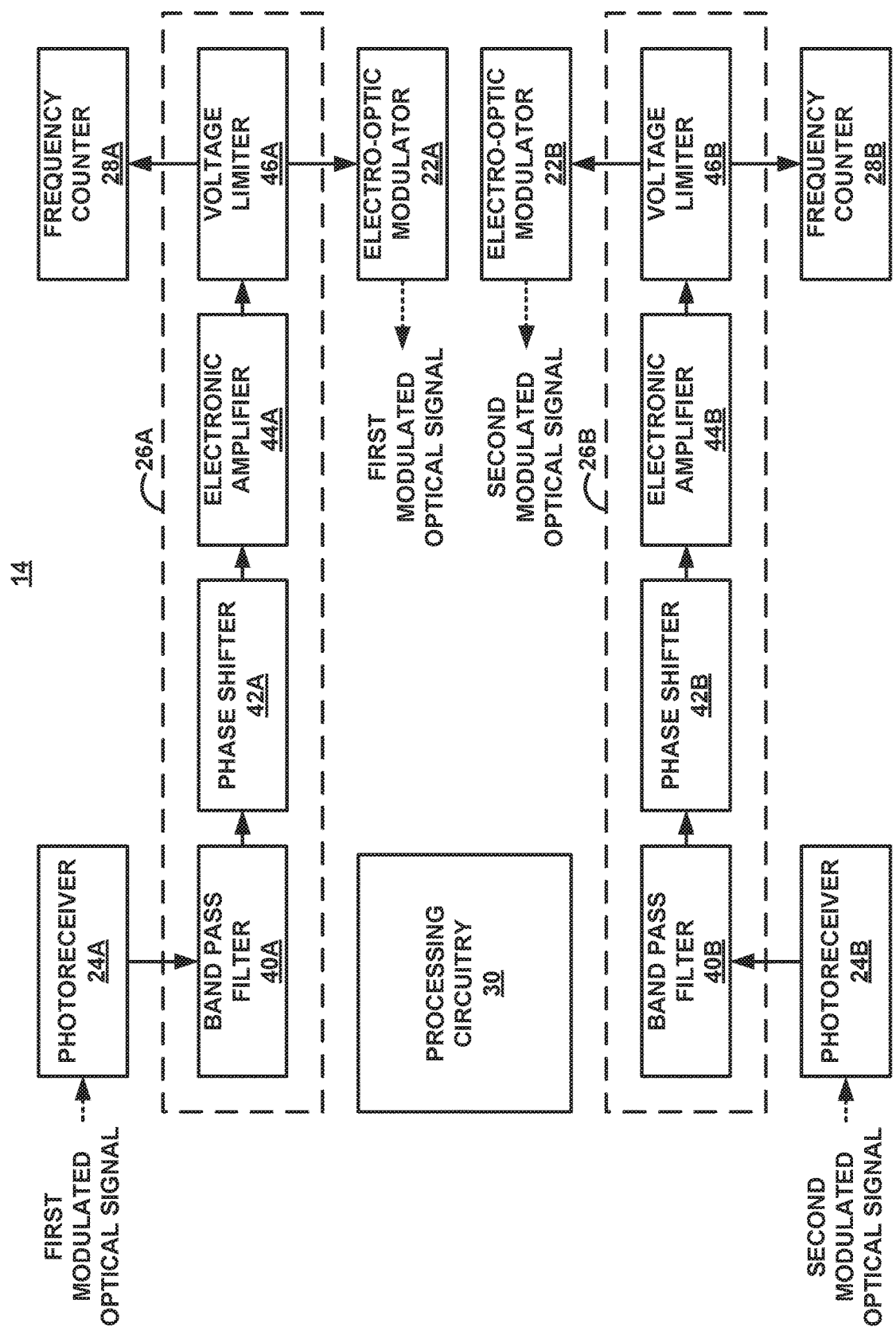
FIG. 2 is a block diagram illustrating the circuit of FIG. 1, in accordance with one or more techniques of this disclosure.

FIG. 2 is a block diagram illustrating circuit 14 of FIG. 1, in accordance with one or more techniques of this disclosure. As illustrated in FIG. 1, circuit 14 includes EOMs 22, photoreceivers 24, feedback units 26, frequency counters 28, and processing circuitry 30. Feedback units 26 include band pass filters 40A, 40B (collectively, "band pass filters 40"), phase shifters 42A, 42B (collectively, "phase shifters 42"), electronic amplifiers 44A, 44B (collectively, "electronic amplifiers 44), and voltage limiters 46A, 46B (collectively, "voltage limiters 46). The first feedback loop includes band pass filter 40A, phase shifter 42A, electronic amplifier 44A, and voltage limiter 46A). The second feedback loop includes band pass filter 40B, phase shifter 42B, electronic amplifier 44B, and voltage limiter 46B.

In some examples, circuit 14 may be configured to receive modulated optical signals from proof mass assembly 16, convert the optical signals into electrical signals, process the electrical signals, analyze the processed electrical signals to determine acceleration values, and use the processed electrical signals to modulate optical signals, thus completing the first feedback loop and the second feedback loop. For example, photoreceiver 24A may receive a first modulated optical signal from a first DETF structure of proof mass assembly 16. The first modulated optical signal may include a frequency component associated with the first DETF structure itself, such as a vibration frequency of the first DETF structure. Photoreceiver 24A may convert the first modulated optical signal into a first electrical signal, preserving the frequency component indicative of the vibration frequency of the first DETF structure. Photoreceiver 24 may transmit the first electrical signal to feedback unit 26A, which includes band pass filter 40A, phase shifter 42A, electronic amplifier 44A, and voltage limiter 46A.

Band pass filter 40A may be an electronic filter that attenuates frequencies outside of a frequency range and "passes" frequencies within the frequency range. In some examples, band pass filter 40A includes any combination of passive filters, active filters, infinite impulse response (IIR) filters, finite impulse response (FIR) filters, Butterworth filters, Chebyshev filters, elliptic filters, Bessel filters, Gaussian filters, Legendre filters, or Linkwitz-Riley filters. In some examples, band pass filter 40A includes a combination of a high pass filter which passes frequencies above a high pass cutoff point and a low pass filter which passes frequencies below a low pass cutoff point. In some cases, band pass filter 40A passes frequencies within a range from 100 kilohertz (kHz) to 10,000 kHz. Additionally, phase shifter 42A may be configured to shift a phase of the first electrical signal. Phase may be characterized as a position of an instant on a waveform cycle of a periodic waveform. For example, the first electrical signal may include periodic waveforms which represent frequency components of the first electrical signal. A maximum peak of a sine wave for example, may be at a different phase than a minimum peak, or a zero crossing of the sine wave. In some examples, phase shifter 42A may "delay" the first electrical signal by a time value in order to shift a timeline in which frequency components of the first electrical signal oscillate.

Electronic amplifier 44A may amplify the first electrical signal such that an amplitude of the first electrical signal is increased by a gain factor. In other words, electronic amplifier 44A may increase a power of the first electrical signal. By amplifying the first electrical signal using electronic amplifier 44A, circuit 14 may improve an ability of processing circuitry 30 to analyze the first electrical signal, and modulate the optical signal emitted by light-emitting device 12 using EOM 22A. Electronic amplifier 44A may include, in some cases, power amplifiers, operational amplifiers, or transistor amplifiers, or any combination thereof. Additionally, in some examples, Voltage limiter 46A is configured to limit a voltage of the first electrical signal to a maximum voltage value. In other words, voltage limiter 46A may prevent the first electrical signal from exceeding the maximum voltage value, meaning that the first processed electrical signal produced by feedback unit 26A may not exceed the maximum voltage value.

In some examples, the first electrical signal may pass through feedback unit 26A in an order from band pass filter 40A, to phase shifter 42A, to electronic amplifier 44A, to voltage limiter 46A, as illustrated in FIG. 2 However, the order illustrated in FIG. 2 is not meant to be limiting. Band pass filter 40A, phase shifter 42A, electronic amplifier 44A, and voltage limiter 46A may be arranged to process the first electrical signal in any valid order.

In some examples, feedback unit 26A may transmit the first processed electrical signal to frequency counter 28A. Frequency counter 28A may determine a first frequency value, and processing circuitry 30 may determine a first acceleration value based on the first frequency value. Additionally, feedback unit 26A may transmit the first processed electrical signal to EOM 22A and EOM 22A may modulate the optical signal emitted by light-emitting device 12 based on the first processed electrical signal. In this way, proof mass assembly 16, photoreceiver 24A, band pass filter 40A, phase shifter 42A, electronic amplifier 44A, voltage limiter 46A, EOM 22A, and frequency counter 28A are a part of the first positive feedback loop which produces the first acceleration value associated with the object including accelerometer system 10.

In some examples, the components of feedback unit 26B (e.g., band pass filter 40B, phase shifter 42B, electronic amplifier 44B, and voltage limiter 46B) may be substantially similar to the respective components of feedback unit 26A. As such, the second positive feedback loop may be substantially similar to the first positive feedback loop.

Figure 3:
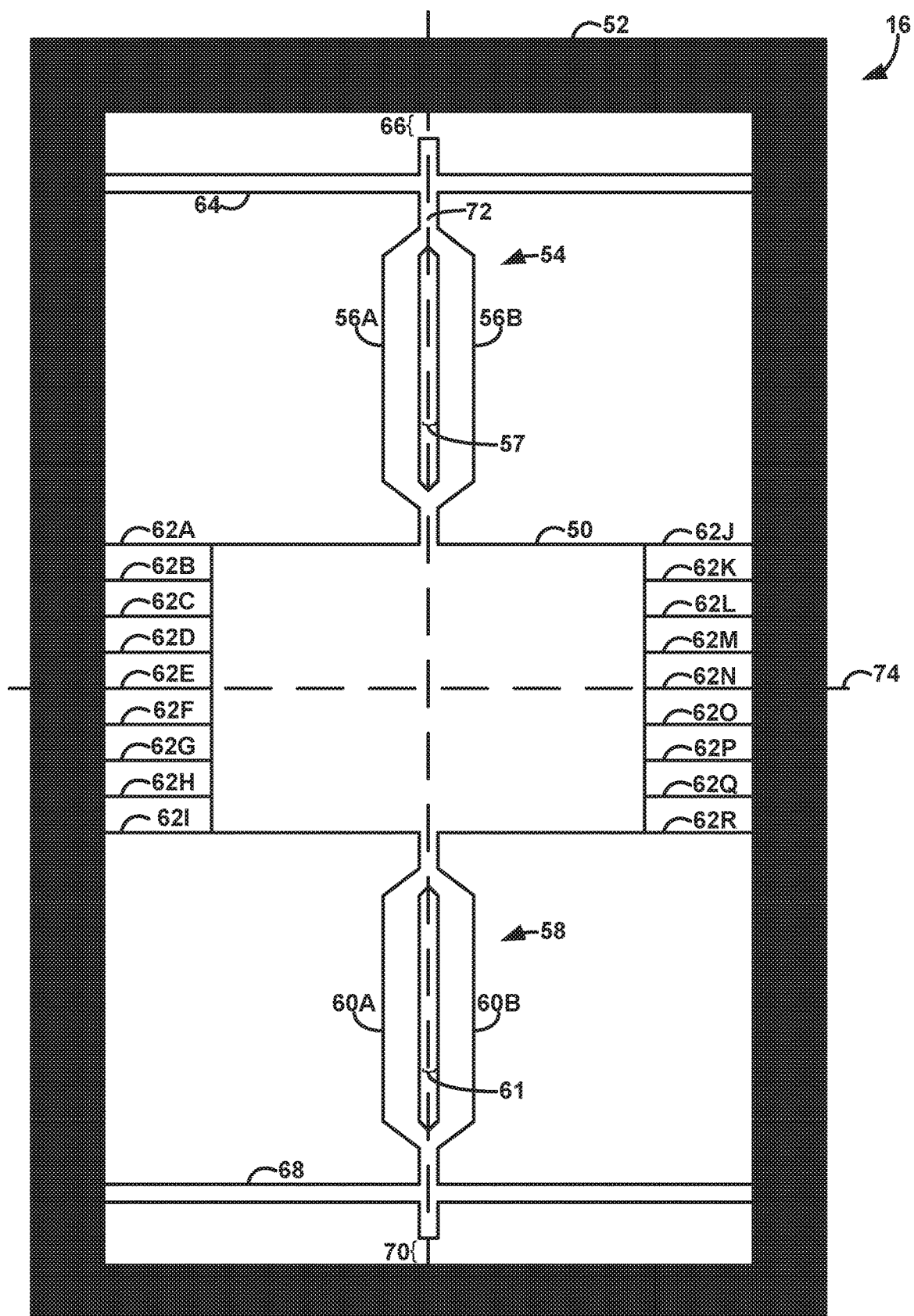
FIG. 3 is a conceptual diagram of the proof mass assembly of FIG. 1 including a proof mass suspended within a frame by a first doubled ended tuning fork (DETF) structure, a second DETF structure, and a set of tethers, in accordance with one or more techniques of this disclosure.

FIG. 3 is a conceptual diagram of proof mass assembly 16 including a proof mass 50 suspended within a frame 52 by a first DETF structure 54, a second DETF structure 58, and a set of tethers 62A-62R, in accordance with one or more techniques of this disclosure. As illustrated in FIG. 3, proof mass assembly 16 includes proof mass 50, frame 52, first DETF structure 54 including a first pair of mechanical beams 56A, 56B (collectively, "first pair of mechanical beams 56"), second DETF structure 58 including a second pair of mechanical beams 60A, 60B (collectively, "second pair of mechanical beams 60"), tethers 62A-62R (collectively, "tethers 62"), first distal tine 64, and second distal tine 68. Proof mass assembly 16 is aligned relative to proof mass displacement axis 72 and proof mass resting plane 74, as illustrated in FIG. 3.

Proof mass assembly 16 is a mechanical component of electro-opto-mechanical accelerometer system 10. Since accelerometer system 10 measures acceleration, which is a rate in which a velocity of an object changes over time, it may be beneficial to include proof mass assembly 16 so that acceleration can be measured based on a physical object such as proof mass 50. For example, accelerometer system 10, which includes proof mass assembly 16 may be fixed to or included within an object. Consequently, as the object accelerates at an acceleration value, proof mass assembly 16 may also accelerate at the acceleration value. Acceleration may affect a position of proof mass 50 within frame 52 relative to proof mass displacement axis 72 and proof mass resting plane 74. For example, non-zero acceleration may cause proof mass 50 to be displaced from proof mass resting plane 74 along proof mass displacement axis 72. As described herein, if proof mass 50 is "displaced," a center of mass of proof mass 50 is displaced relative to frame 52. Increasing a magnitude of acceleration may cause the displacement of proof mass 50 along proof mass displacement axis 72 to increase. Additionally, decreasing a magnitude of acceleration may cause the displacement of proof mass 50 along proof mass displacement axis 72 to decrease.

In some examples, proof mass 50 takes the form of a patterned thin film, where the thin film has a mass within a range between 100 nanograms (ng) and 10,000 ng. Additionally, in some cases, the thin film has a thickness within a range between 1 nm and 5,000 nm. Proof mass 50 may be suspended within frame 52 along proof mass displacement axis 72 by first DETF structure 54 and second DETF structure 58 (collectively, "DETF structures 54, 58"). First DETF structure 54 and second DETF structure 58 may each have a high level of stiffness. For example, a scale factor of each of first DETF structure 54 and second DETF structure 58 may be within a range between 0.1 parts per million per gravitational force equivalent (ppm/G) and 10 ppm/G. In this way, proof mass assembly 16 may include a very light proof mass 50 which is secured by very stiff DTEF structures 54, 58. As such, a very high acceleration (e.g., 100,000 m/s$^2$) may cause proof mass 50 to be displaced along the proof mass displacement axis 72 by a very small displacement value, for example. In some examples, proof mass 50 is displaced along the proof mass displacement axis 72 by a displacement value of up to 100 nm.

In order to generate acceleration values indicative of the acceleration of the object in which accelerometer system 10 is fixed to, accelerometer system 10 may quantify, using optical signals, the displacement of proof mass 50 within frame 52. To quantify the displacement of proof mass 50, accelerometer system 10 may measure and analyze mechanical properties of DETF structures 54, 58, such as mechanical vibrating frequency values corresponding to DETF structures 54, 58. Indeed, since DETF structures 54, 58 suspend proof mass 50, the mechanical vibrating frequencies of DETF structures 54, 58 may be affected due to a displacement of proof mass 50. For example, a displacement of proof mass 50 towards first DETF structure 54 and away from second DETF structure 58 may cause proof mass 50 to apply a compression force to first DETF structure 54 and apply a tension force to second DETF structure 58. Such a compression force may cause the mechanical vibration frequency of first DETF structure 54 to decrease and such a tension force may cause the mechanical vibration force of second DETF structure 58 to increase. Changes in the mechanical vibration frequencies of DETF structures 54, 58 may, in some examples, be proportional to the displacement of proof mass 50 relative to frame 52 in the direction of proof mass displacement axis 72. In some examples, Accelerometer system 10 may measure changes in the mechanical vibration frequencies of DETF structures 54, 58 by transmitting modulated optical signals through DETF structures 54, 58.

First DETF structure 54 may include, for example, the first pair of mechanical beams 56 separated by a first gap 57. The first pair of mechanical beams 56 may include corrugated mechanical beams that are configured for guiding a first modulated optical signal while first DETF structure 54 is oscillating at a first mechanical vibrating frequency. In some cases, the first modulated optical signal is emitted by light-emitting device 12 (illustrated in FIG. 1), and the first modulated optical signal itself induces vibration in first DETF structure 54. Additionally, the vibration of the first DETF structure 54 may affect certain properties of the first modulated optical signal such that the mechanical vibrating frequency of the first DETF structure 54 is reflected in the first modulated optical signal. In this way, the first modulated optical signal may cause the mechanical vibration in the first DETF structure 54 and enable accelerometer system 10 to measure the mechanical vibration frequency of the first DETF structure 54 based on the first modulated optical signal.

In some examples, one or more corrugated edges of mechanical beams 56 may cause an optical cavity to form in first gap 57 between mechanical beam 56A and mechanical beam 56B. For example, mechanical beam 56A may include at least one of a first corrugated inner edge parallel to proof mass displacement axis 72 and a first corrugated outer edge parallel to proof mass displacement axis 72. Additionally, mechanical beam 56B may include at least one of a second corrugated inner edge parallel to proof mass displacement axis 72 and a second corrugated outer edge parallel to proof mass displacement axis 72. In some examples, mechanical beam 56A includes the first corrugated inner edge and a first straight outer edge parallel to proof mass displacement axis 72, and mechanical beam 56B includes the second corrugated inner edge and a second straight outer edge parallel to proof mass displacement axis 72. In some examples, mechanical beam 56A includes a first straight inner edge parallel to proof mass displacement axis 72 and the first corrugated outer edge, and mechanical beam 56B includes a second straight inner edge parallel to proof mass displacement axis 72 and the second corrugated outer edge. Additionally, in some examples, mechanical beams 56A includes the first corrugated inner edge and the first corrugated outer edge, and where mechanical beam 56B includes the second corrugated inner edge and the second corrugated outer edge.

Additionally, second DETF structure 58 may include, for example, the second pair of mechanical beams 60 separated by a second gap 61. The second pair of mechanical beams 60 may include corrugated mechanical beams that are configured for guiding a second modulated optical signal while second DETF structure 58 is oscillating at a second mechanical vibrating frequency. In some cases, the second modulated optical signal is emitted by light-emitting device 12 (illustrated in FIG. 1), and the second modulated optical signal itself induces vibration in second DETF structure 58. Additionally, the vibration of the second DETF structure 58 may affect certain properties of the second modulated optical signal such that the mechanical vibrating frequency of the second DETF structure 58 is reflected in the second modulated optical signal. In this way, the second modulated optical signal may cause the mechanical vibration to occur in the second DETF structure 58 and enable accelerometer system 10 to measure the mechanical vibration frequency of the second DETF structure 58 based on the second modulated optical signal.

In some examples, one or more corrugated edges of the second set of mechanical beams 60 may cause an optical cavity to form in second gap 61 between mechanical beam 60A and mechanical beam 60B. For example, mechanical beam 60A may include at least one of a third corrugated inner edge parallel to proof mass displacement axis 72 and a third corrugated outer edge parallel to proof mass displacement axis 72. Additionally, mechanical beam 60B may include at least one of a fourth corrugated inner edge parallel to proof mass displacement axis 72 and a fourth corrugated outer edge parallel to proof mass displacement axis 72. In some examples, mechanical beam 60A includes the third corrugated inner edge and a third straight outer edge parallel to proof mass displacement axis 72, and mechanical beam 60B includes the fourth corrugated inner edge and a fourth straight outer edge parallel to proof mass displacement axis 72. In some examples, mechanical beam 60A includes a third straight inner edge parallel to proof mass displacement axis 72 and the third corrugated outer edge, and mechanical beam 60B includes a fourth straight inner edge parallel to proof mass displacement axis 72 and the fourth corrugated outer edge. Additionally, in some examples, mechanical beams 60A includes the third corrugated inner edge and the third corrugated outer edge, and where mechanical beam 60B includes the fourth corrugated inner edge and the fourth corrugated outer edge.

In some examples, a width of each of mechanical beams 56A, 56B, 60A, and 60B is within a range from 300 nanometers (nm) and 3,000 nm. The "width" of mechanical beams 56A, 56B, 60A, and 60B may be given by a distance across a cross-section of the respective mechanical beam, where the cross section is parallel to proof mass resting plane 74. Additionally, in some examples, a width of each of first gap 57 and second gap 61 is within a range from 100 nm to 1,000 nm.

Proof mass 50 may be fixed to frame 52 by tethers 62. In some examples, tethers 62 may suspend proof mass 50 in proof mass resting plane 74 such that the center of mass of proof mass 50 does not move within proof mass resting plane 74 relative to frame 52. Proof mass displacement axis 72 may represent a single axis (e.g., x-axis) of a Cartesian space, and proof mass resting plane 74 may represent two axes (e.g., y-axis and z-axis) of the Cartesian space. Since tethers 62 may restrict proof mass 50 from being displaced relative to proof mass resting plane 74, in some examples, proof mass 50 may only be displaced along the proof mass displacement axis 72. Accelerometer system 10 may measure an acceleration based on mechanical vibrating frequencies of DETF structures 54, 58, where the mechanical vibrating frequencies are related to an amount of displacement of proof mass 50 along proof mass displacement axis 72. In this way, the acceleration determined by accelerometer system 10 may be an acceleration relative to proof mass displacement axis 72.

First DETF structure 54 may include a proximal end that is proximate to proof mass 50, and a distal end that is separated from frame 52 by a first space 66. First distal tine 64 may help to suspend first DETF structure 54 within frame 52 such that the first DETF structure 54 is perpendicular to proof mass resting plane 74. In some examples, first distal tine 64 extends perpendicularly to proof mass displacement axis 72 between two sidewalls of frame 52. An optical signal may travel through frame 52 via a first optical fiber (not illustrated in FIG. 3), the optical signal being coupled across first space 66 to first DETF structure 54.

Second DETF structure 58 may include a proximal end that is proximate to proof mass 50, and a distal end that is separated from frame 52 by a second space 70. Second distal tine 68 may help to suspend second DETF structure 58 within frame 52 such that the second DETF structure 58 is perpendicular to proof mass resting plane 74. In some examples, second distal tine 68 extends perpendicularly to proof mass displacement axis 72 between two sidewalls of frame 52. An optical signal may travel through frame 52 via a second optical fiber (not illustrated in FIG. 3), the optical signal being coupled across second space 70 to second DETF structure 58.

Figure 4:
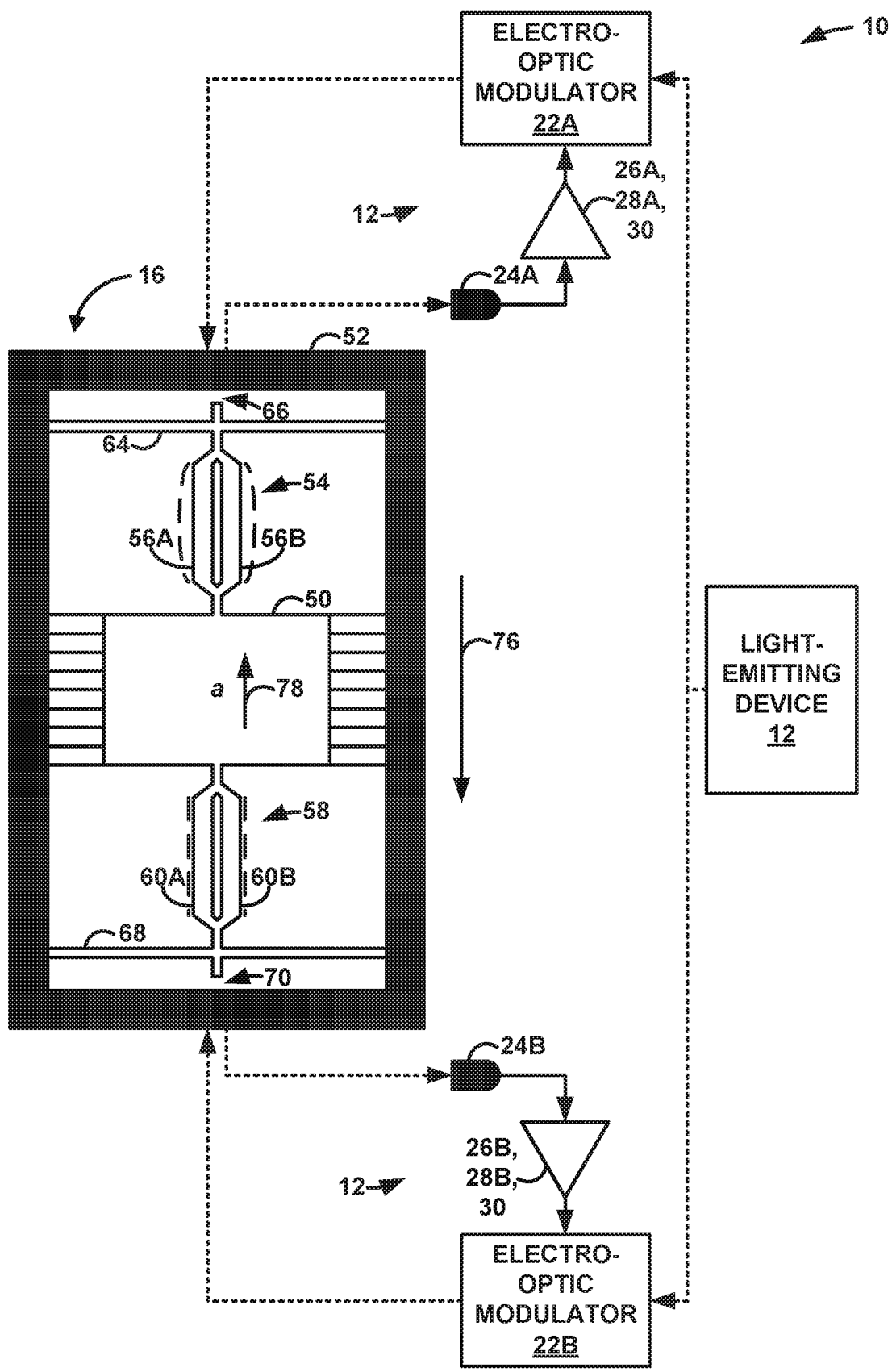
FIG. 4 is a conceptual diagram of the accelerometer system of FIG. 1, in accordance with one or more techniques of this disclosure.

FIG. 4 is a conceptual diagram of accelerometer system 10, in accordance with one or more techniques of this disclosure. The conceptual diagram of FIG. 4 includes light-emitting device 12, components of circuit 14, and proof mass assembly 16.

In some examples, an object may be fixed to accelerometer system 10. The object, in some cases, may accelerate. Accelerometer system 10, including proof mass assembly 16, may accelerate with the object. As proof mass assembly 16 accelerates, proof mass 50 may be displaced relative to frame 52. In the example illustrated in FIG. 4, if proof mass assembly 16 accelerates in direction 78, proof mass 50 is displaced in direction 78. Direction 78, in some examples, is aligned with a proof mass displacement axis (e.g., proof mass displacement axis 72 of FIG. 3. As proof mass 50 is displaced in direction 78 relative to frame 52, proof mass 50 applies a compression force to first DETF structure 54, and proof mass 50 applies a tension force to second DETF structure 58. Such forces may affect mechanical vibrating frequencies of DETF structures 54, 58, where mechanical vibration is induced in first DETF structure 54 and second DETF structure 58 by electro-optic modulator 22A and electro-optic modulator 22B, respectively. For example, the compression force applied to first DETF structure 54 may cause the mechanical vibration frequency of first DETF structure 54 to decrease, and the tension force applied to second DETF structure 58 may cause the mechanical vibration frequency of second DETF structure 58 to increase.

Light-emitting device 12 may emit an optical signal to EOMs 22. In turn, EOM 22A and EOM 22B may modulate the optical signal according to a first processed electrical signal produced by feedback unit 26A and a second processed electrical signal produced by feedback unit 26B, respectively. As such, EOM 22A produces a first modulated optical signal and EOM 22B produces a second modulated optical signal. EOM 22A, for example, may transmit the first modulated optical signal to proof mass assembly 16. The first modulated optical signal may cross frame 52. In some examples, frame 52 includes an aperture or another opening bridged by a first optical fiber which allows the first modulated optical signal to pass. Additionally, the first modulated optical signal may couple across first space 66 to the first DETF structure 54. The first modulated optical signal may propagate through first DETF structure 54, inducing mechanical vibration in first DETF structure 54. In some examples, the first modulated optical signal propagates the length of first DETF structure 54 towards proof mass 50 and subsequently propagates the length of first DETF structure 54 away from proof mass 50. By propagating the length of first DETF structure 54, the first modulated optical signal may retain information indicative of mechanical properties (e.g., the mechanical vibration frequency) of first DETF structure 54. After the first modulated optical signal propagates through first DETF structure 54, the first modulated optical signal may exit proof mass assembly 16 via first space 66 and the first optical fiber of frame 52.

After exiting proof mass assembly 16, the first modulated optical signal may arrive at photoreceiver 24A. Photoreceiver 24A converts the first modulated optical signal into a first electrical signal, and feedback unit 26A processes the first electrical signal to produce a first processed electrical signal. Frequency counter 28A may determine a first frequency value corresponding to the first processed electrical signal, where the first frequency value is indicative of the mechanical vibrating frequency of the first DETF structure 54. Processing circuitry 30 may subtract a baseline frequency value from the first frequency value to obtain a first frequency difference value and calculate a first acceleration value based on the first frequency difference value. EOM 22A may use the first processed electrical signal to modulate the optical signal emitted by light-emitting device 12.

EOM 22B, for example, may transmit the second modulated optical signal to proof mass assembly 16. The second modulated optical signal may cross frame 52. In some examples, frame 52 includes an aperture or another opening bridged by a second optical fiber which allows the second modulated optical signal to pass. Additionally, the second modulated optical signal may couple across second space 70 to the second DETF structure 58. The second modulated optical signal may propagate through second DETF structure 58, inducing mechanical vibration in second DETF structure 58. In some examples, the second modulated optical signal propagates the length of second DETF structure 58 towards proof mass 50 along mechanical beams 60 and subsequently propagates the length of second DETF structure 58 away from proof mass 50 along mechanical beams 60. By propagating the length of second DETF structure 58, the second modulated optical signal may retain information indicative of mechanical properties (e.g., the mechanical vibration frequency) of second DETF structure 58. After the second modulated optical signal propagates through second DETF structure 58, the second modulated optical signal may exit proof mass assembly 16 via second space 70 and the second optical fiber of frame 52.

After exiting proof mass assembly 16, the second modulated optical signal may arrive at photoreceiver 24B. Photoreceiver 24B converts the second modulated optical signal into a second electrical signal, and feedback unit 26B processes the second electrical signal to produce a second processed electrical signal. Frequency counter 28B may determine a second frequency value corresponding to the second processed electrical signal, where the second frequency value is indicative of the mechanical vibrating frequency of the second DETF structure 58. Processing circuitry 30 may subtract a baseline frequency value from the second frequency value to obtain a second frequency difference value and calculate a second acceleration value based on the second frequency difference value. EOM 22B may use the second processed electrical signal to modulate the optical signal emitted by light-emitting device 12.

Figure 5A:
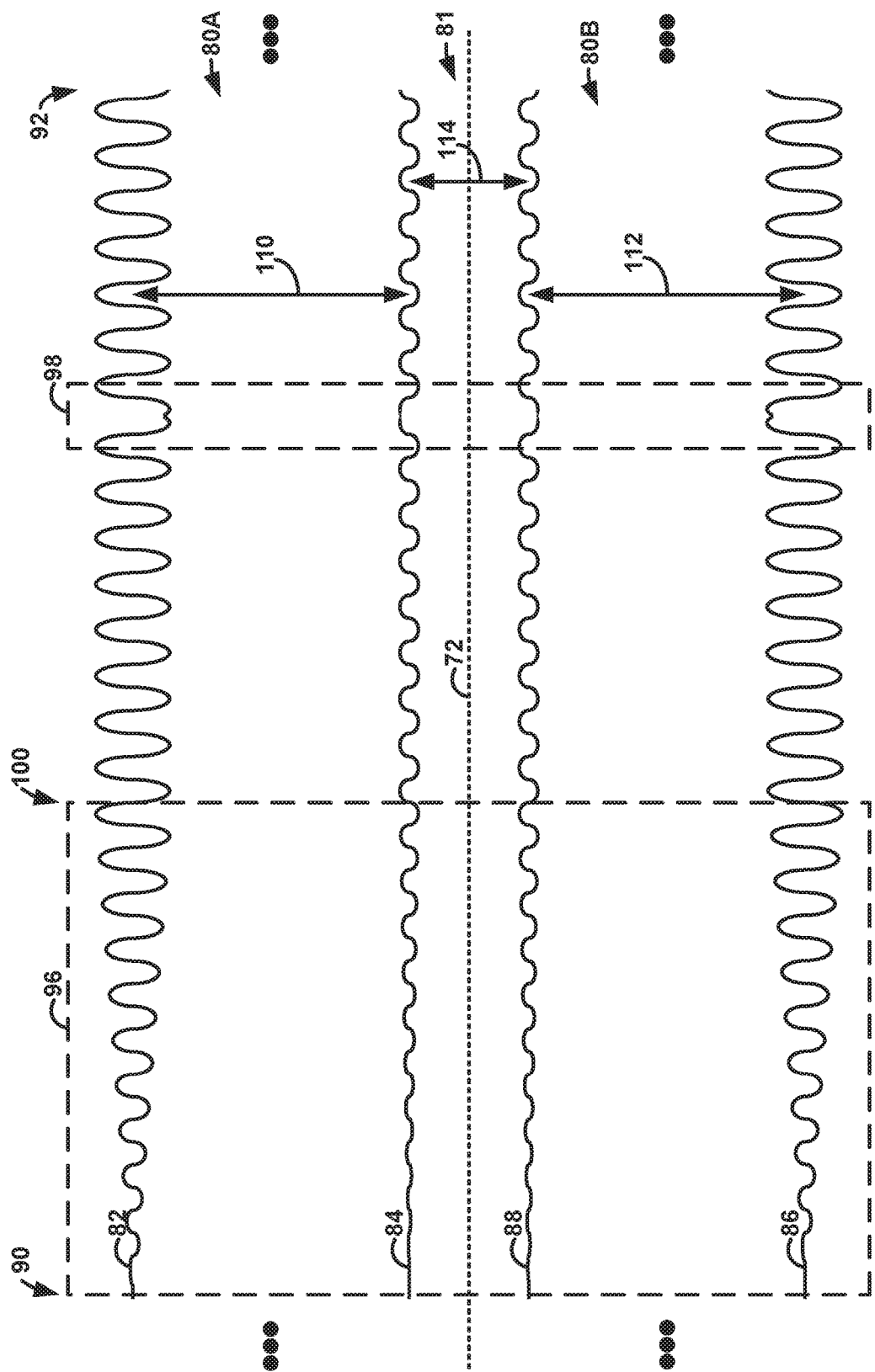
FIG. 5A is a conceptual diagram of an example pair of mechanical beams, in accordance with one or more techniques of this disclosure.

FIG. 5A is a conceptual diagram of an example pair of mechanical beams 80A, 80B (collectively, "mechanical beams 80"), in accordance with one or more techniques of this disclosure. In some examples, mechanical beam 80A is an example of mechanical beam 56A of FIGS. 3 and 4, mechanical beam 80B is an example of mechanical beam 56B of FIGS. 3 and 4, and gap 81 is an example of first gap 57 of FIG. 3. Additionally, in some examples, mechanical beam 80A is an example of mechanical beam 60A of FIGS. 3 and 4, mechanical beam 80B is an example of mechanical beam 60B of FIGS. 3 and 4, and gap 81 is an example of second gap 61 of FIG. 3.

Mechanical beam 80A may include first outer corrugated edge 82 and first inner corrugated edge 84. Additionally, mechanical beam 80B may include second outer corrugated edge 86, and second inner corrugated edge 88. Mechanical beams 80 may extend along proof mass displacement axis 72 from distal end 90 to proximal end 92. Distal end 90 may be proximate to a distal tine (e.g., first distal tine 64 or second distal time 68). Proximal end 92 may be proximate to proof mass 50. In this way, a DETF structure (e.g., first DETF structure 54 or second DETF structure 58) which includes mechanical beams 80, may be physically connected to proof mass 50 proximate to proximal end 92 such that the DETF structure suspends proof mass 50 within frame 52. A modulated optical signal (e.g., the first modulated optical signal emitted by EOM 22A or the second modulated optical signal emitted by EOM 22B) may cross frame 52 via an optical fiber and couple across a space (e.g., first space 66 or second space 70) to the DETF structure including mechanical beams 80. In some examples, the modulated optical signal may propagate through mechanical beams 80 from distal end 90 to proximal end 92, arrive at proof mass 50, and subsequently propagate through mechanical beams 80 from proximal end 92 to distal end 90.

In some examples, one or more sinusoidal functions may represent each of first outer corrugated edge 82, first inner corrugated edge 84, second outer corrugated edge 86, and second inner corrugated edge 88 (collectively, "corrugated edges 82, 84, 86, 88"). In this way, each of corrugated edges 82, 84, 86, 88 may resemble an oscillating pattern. Additionally, in some examples, one or more other functions (e.g., square functions, triangle functions, exponential functions, linear functions, polynomial functions, quadratic functions, or any combination thereof) may represent each of corrugated edges 82, 84, 86, 88. The one or more functions may be continuous (e.g., analog) or discrete (e.g., digital) in nature.

Corrugated edges 82, 84, 86, 88 may improve an efficiency in which mechanical beams 80 propagate optical signals. For example, a modulated optical signal (e.g., the first modulated optical signal emitted by EOM 22A or the second modulated optical signal emitted by EOM 22B) may arrive at the DETF structure including mechanical beams 80 after coupling across a space (e.g., first space 66 or second space 70). The modulated optical signal may propagate first through tapered section 96 of mechanical beams 80. As seen in FIG. 5A, tapered section 96 is a section of mechanical beams 80 in which an amplitude of corrugated edges 82, 84, 86, 88 increases along proof mass displacement axis 72 from distal end 90 to tapered section proximal end 100, where distal end 90 is a proximal end of tapered section 96. In some examples, it may be beneficial for amplitudes of corrugated edges 82, 84, 86, 88 to increase across tapered section 96 in order to increase an optical efficiency of mechanical beams 80. In other words, increasing the amplitude of corrugated edges 82, 84, 86, 88 across tapered section 96 may decrease an amount of attenuation in an optical signal due to the optical signal propagating through mechanical beams 80. As such, increasing the amplitude of corrugated edges 82, 84, 86, 88 across tapered section 96 may improve an accuracy of acceleration values determined by accelerometer system 10 based on the first modulated optical signal that propagate through first DETF structure 54 of proof mass assembly 16.

In some examples, the amplitude of first outer corrugated edge 82 and second outer corrugated edge 86 may increase from a first amplitude to a second amplitude across tapered section 96 from distal end 90 to the tapered section proximal end 100. In some examples, the first amplitude is within a range from 0 nm to 20 nm. In some examples, the second amplitude is within a range from 80 nm to 300 nm. Additionally, in some examples, the amplitude of first inner corrugated edge 84 and second inner corrugated edge 88 may increase from a third amplitude to a fourth amplitude across tapered section 96 from distal end 90 to the tapered section proximal end 100. In some examples, the third amplitude is within a range from 0 nm to 20 nm. In some examples, the fourth amplitude is within a range from 80 nm to 300 nm. Width values associated with the first amplitude, the second amplitude, the third amplitude, and the fourth amplitude may be within a range between 0% of a width of mechanical beam 80A and 50% of a width of mechanical beam 80A. In some examples, the first amplitude, the second amplitude, the third amplitude, and the fourth amplitude represent peak-to-peak amplitudes (e.g., a distance between a maximum peak and a minimum peak within a respective wave period of corrugated edges 82, 84, 86, 88).

Corrugated edges 82, 84, 86, 88 may cause, in response to optical signals propagating through mechanical beams 80, an optical cavity to form in gap 81 between mechanical beam 80A and mechanical beam 80B. For example, corrugated edges 82, 84, 86, 88 may include a defect 98, where defect 98 causes the optical cavity to form, thus causing optical energy to be localized in gap 81. Defect 98 may represent a break (e.g., a discontinuity) in the oscillatory pattern of each of corrugated edges 82, 84, 86, 88. Such a break may cause at cause a high-confinement region of optical energy to form in gap 81. As such, the optical cavity, which represents a confined optical field, may form in gap 81 along proof mass displacement axis 72 and proximate to defect 98. The confined optical field applies pressure to mechanical beams 80. In this way, the optical cavity may induce a mechanical vibration in mechanical beams 80. A mechanical vibration frequency of mechanical beams 80 may, in some cases, depend on a displacement of proof mass 50, the displacement due to an acceleration of accelerometer system 10. The mechanical vibration frequency of mechanical beams 80 may be reflected in the first modulated optical signal after the first modulated optical signal fully propagates through first DETF structure 54. As such, photoreceiver 24A of circuit 14 may receive the first modulated optical signal and circuit 14 may determine an acceleration value based on the mechanical vibration frequency of mechanical beams 80.

As seen in FIG. 5A, defect 98 is distal to tapered section 96. In some examples, defect 98 may be substantially midway between the tapered section proximal end 100 and the proximal end 92 of mechanical beams 80. In some examples, a width 110 of mechanical beam 80A may be within a range from 300 nm to 3,000 nm. In some examples, a width 112 of mechanical beam 80B may be within a range from 300 nm to 3,000 nm. Additionally, in some examples, a width 114 of gap 81 may be within a range from 100 nm to 1,000 nm.

Figure 5B:
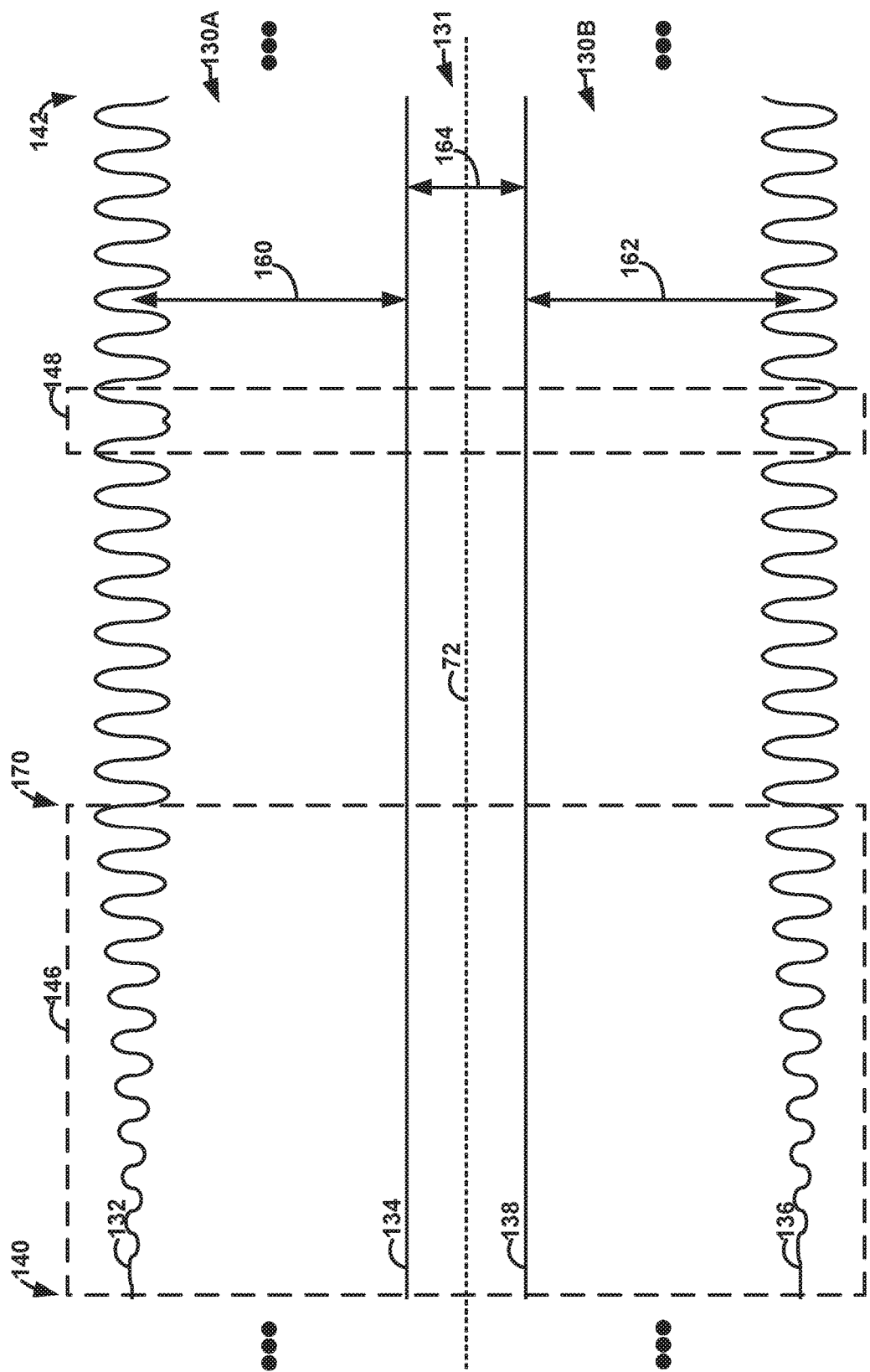
FIG. 5B is a conceptual diagram of another example pair of mechanical beams, in accordance with one or more techniques of this disclosure.

FIG. 5B is a conceptual diagram of another example pair of mechanical beams 130A, 130B (collectively, "mechanical beams 130"), in accordance with one or more techniques of this disclosure. In some examples, mechanical beam 130A is an example of mechanical beam 56A of FIGS. 3 and 4, mechanical beam 130B is an example of mechanical beam 56B of FIGS. 3 and 4, and gap 131 is an example of first gap 57 of FIG. 3. Additionally, in some examples, mechanical beam 130A is an example of mechanical beam 60A of FIGS. 3 and 4, mechanical beam 130B is an example of mechanical beam 60B of FIGS. 3 and 4, and gap 131 is an example of second gap 61 of FIG. 3.

Mechanical beam 130A may include first outer corrugated edge 132 and first inner straight edge 134. Additionally, mechanical beam 130B may include second outer corrugated edge 136, and second inner straight edge 138. Mechanical beams 130 may extend along proof mass displacement axis 72 from distal end 140 to proximal end 142. Distal end 140 may be proximate to a distal tine (e.g., first distal tine 64 or second distal time 68). Proximal end 142 may be proximate to proof mass 50. In this way, a DETF structure (e.g., first DETF structure 54 or second DETF structure 58) which includes mechanical beams 130, may be physically connected to proof mass 50 proximate to proximal end 142 such that the DETF structure suspends proof mass 50 within frame 52. A modulated optical signal (e.g., the first modulated optical signal emitted by EOM 22A or the second modulated optical signal emitted by EOM 22B) may cross frame 52 via an optical fiber and couple across a space (e.g., first space 66 or second space 70) to the DETF structure including mechanical beams 130. In some examples, the modulated optical signal may propagate through mechanical beam 130A from distal end 140 to proximal end 142, arrive at proof mass 50, and subsequently propagate through mechanical beam 130B from proximal end 142 to distal end 140. Additionally, in some examples, the modulated optical signal may propagate through mechanical beam 130B from distal end 140 to proximal end 142, arrive at proof mass 50, and subsequently propagate through mechanical beam 130A from proximal end 142 to distal end 140.

In some examples, one or more sinusoidal functions may represent each of first outer corrugated edge 132 and second outer corrugated edge 136 (collectively, "outer corrugated edges 132, 136). In this way, each of outer corrugated edges 132, 136 may resemble an oscillating pattern. Additionally, in some examples, one or more other functions (e.g., exponential, linear, polynomial, quadratic, or any combination thereof) may represent each of outer corrugated edges 132, 136. In some examples, first inner straight edge 134 and second inner straight edge 138 may be substantially straight and parallel to proof mass displacement axis 72.

Outer corrugated edges 132, 136 may improve an efficiency in which mechanical beams 130 propagate optical signals. For example, a modulated optical signal (e.g., the first modulated optical signal emitted by EOM 22A or the second modulated optical signal emitted by EOM 22B) may arrive at the DETF structure including mechanical beams 130 after coupling across a space (e.g., first space 66 or second space 70). The modulated optical signal may propagate first through tapered section 146 of mechanical beams 130. As seen in FIG. 5B, tapered section 146 is a section of mechanical beams 130 in which an amplitude of outer corrugated edges 132, 136 increases along proof mass displacement axis 72 from distal end 140 to a tapered section proximal end 170, where distal end 140 is a proximal end of tapered section 146. In some examples, it may be beneficial for amplitudes of outer corrugated edges 132, 136 to increase across tapered section 146 in order to increase an optical efficiency of mechanical beams 146. In other words, increasing the amplitude of outer corrugated edges 132, 136 across tapered section 146 may decrease an amount of attenuation in an optical signal due to the optical signal propagating through mechanical beams 130. As such, increasing the amplitude of outer corrugated edges 132, 136 across tapered section 146 may improve an accuracy of acceleration values determined by accelerometer system 10 based on the first modulated optical signal that propagate through first DETF structure 54 of proof mass assembly 16. In some examples, the amplitude of first outer corrugated edge 132 and second outer corrugated edge 136 may increase from a first amplitude to a second amplitude across tapered section 146 from distal end 140 to the tapered section proximal end 170. In some examples, the first amplitude is within a range from 0 nm to 20 nm. In some examples, the second amplitude is within a range from 80 nm to 300 nm.

Outer corrugated edges 132, 136 may cause, in response to optical signals propagating through mechanical beams 130, an optical cavity to form in gap 131 between mechanical beam 130A and mechanical beam 130B. For example, outer corrugated edges 132, 136 may include a defect 148, where defect 148 causes the optical cavity to form in gap 131. Defect 148 may represent a break (e.g., a discontinuity) in the oscillatory pattern of each of outer corrugated edges 132, 136. Such a break may cause a high-confinement region of optical energy to form in gap 131. As such, the optical cavity, which represents a confined optical field, may form in gap 131 along proof mass displacement axis 72 and proximate to defect 148. The confined optical field applies pressure to mechanical beams 130. In this way, the optical cavity may induce a mechanical vibration in mechanical beams 130. A mechanical vibration frequency of mechanical beams 130 may, in some cases, depend on a displacement of proof mass 50, the displacement due to an acceleration of accelerometer system 10. The mechanical vibration frequency of mechanical beams 130 may be reflected in the first modulated optical signal after the first modulated optical signal fully propagates through first DETF structure 54. As such, photoreceiver 24A of circuit 14 may receive the first modulated optical signal and circuit 14 may determine an acceleration value based on the mechanical vibration frequency of mechanical beams 130.

As seen in FIG. 5B, defect 148 is distal to tapered section 146. In some examples, defect 148 may be substantially midway between the tapered section proximal end 170 and the proximal end 142 of mechanical beams 130. In some examples, a width 160 of mechanical beam 130A may be within a range from 300 nm to 3,000 nm. In some examples, a width 162 of mechanical beam 130B may be within a range from 300 nm to 3,000 nm. Additionally, in some examples, a width 164 of gap 131 may be within a range from 100 nm to 1,000 nm.

FIG. 5C is a conceptual diagram of another example pair of mechanical beams 180A, 180B (collectively, "mechanical beams 180"), in accordance with one or more techniques of this disclosure. In some examples, mechanical beam 180A is an example of mechanical beam 56A of FIGS. 3 and 4, mechanical beam 180B is an example of mechanical beam 56B of FIGS. 3 and 4, and gap 181 is an example of first gap 57 of FIG. 3. Additionally, in some examples, mechanical beam 180A is an example of mechanical beam 60A of FIGS. 3 and 4, mechanical beam 180B is an example of mechanical beam 60B of FIGS. 3 and 4, and gap 181 is an example of second gap 61 of FIG. 3.

Mechanical beam 180A may include first outer straight edge 182 and first inner corrugated edge 184. Additionally, mechanical beam 180B may include second outer straight edge 186, and second inner corrugated edge 188. Mechanical beams 180 may extend along proof mass displacement axis 72 from distal end 190 to proximal end 192. Distal end 190 may be proximate to a distal tine (e.g., first distal tine 64 or second distal time 68). Proximal end 192 may be proximate to proof mass 50. In this way, a DETF structure (e.g., first DETF structure 54 or second DETF structure 58) which includes mechanical beams 180, may be physically connected to proof mass 50 proximate to proximal end 192 such that the DETF structure suspends proof mass 50 within frame 52. A modulated optical signal (e.g., the first modulated optical signal emitted by EOM 22A or the second modulated optical signal emitted by EOM 22B) may cross frame 52 via an optical fiber and couple across a space (e.g., first space 66 or second space 70) to the DETF structure including mechanical beams 180. In some examples, the modulated optical signal may propagate through mechanical beam 180A from distal end 190 to proximal end 192, arrive at proof mass 50, and subsequently propagate through mechanical beam 180B from proximal end 192 to distal end 190. Additionally, in some examples, the modulated optical signal may propagate through mechanical beam 180B from distal end 190 to proximal end 192, arrive at proof mass 50, and subsequently propagate through mechanical beam 180A from proximal end 192 to distal end 190.

In some examples, one or more sinusoidal functions may represent each of first inner corrugated edge 184 and second inner corrugated edge 188 (collectively, "inner corrugated edges 184, 188"). In this way, each of inner corrugated edges 184, 188 may resemble an oscillating pattern. Additionally, in some examples, one or more other functions (e.g., exponential, linear, polynomial, quadratic, or any combination thereof) may represent each of inner corrugated edges 184, 188. In some examples, first outer straight edge 182 and second outer straight edge 186 may be substantially straight and parallel to proof mass displacement axis 72.

Inner corrugated edges 184, 188 may improve an efficiency in which mechanical beams 180 propagate optical signals. For example, a modulated optical signal (e.g., the first modulated optical signal emitted by EOM 22A or the second modulated optical signal emitted by EOM 22B) may arrive at the DETF structure including mechanical beams 180 after coupling across a space (e.g., first space 66 or second space 70). The modulated optical signal may propagate first through tapered section 196 of mechanical beams 180. As seen in FIG. 5C, tapered section 196 is a section of mechanical beams 180 in which an amplitude of inner corrugated edges 184, 188 increases along proof mass displacement axis 72 from distal end 190 to tapered section proximal end 200, where distal end 190 is a proximal end of tapered section 196. In some examples, it may be beneficial for amplitudes of inner corrugated edges 184, 188 to increase across tapered section 196 in order to increase an optical efficiency of mechanical beams 180. In other words, increasing the amplitude of inner corrugated edges 184, 188 across tapered section 196 may decrease an amount of attenuation in an optical signal due to the optical signal propagating through mechanical beams 180. As such, increasing the amplitude of inner corrugated edges 184, 188 across tapered section 196 may improve an accuracy of acceleration values determined by accelerometer system 10 based on the first modulated optical signal that propagate through first DETF structure 54 of proof mass assembly 16. In some examples, the amplitude of first inner corrugated edge 184 and second inner corrugated edge 188 may increase from a first amplitude to a second amplitude across tapered section 196 from distal end 190 to the tapered section proximal end 200. In some examples, the first amplitude is within a range from 0 nm to 20 nm. In some examples, the second amplitude is within a range from 80 nm to 300 nm.

Inner corrugated edges 184, 188 may cause, in response to optical signals propagating through mechanical beams 180, an optical cavity to form in gap 181 between mechanical beam 180A and mechanical beam 180B. For example, inner corrugated edges 184, 188 may include a defect 198, where defect 198 causes the optical cavity to form in gap 181. Defect 198 may represent a break (e.g., a discontinuity) in the oscillatory pattern of each of inner corrugated edges 184, 188. Such a break may cause a high-confinement region of optical energy to form in gap 181. As such, the optical cavity, which represents a confined optical field, may form in gap 181 along proof mass displacement axis 72 and proximate to defect 198. The optical cavity may contain potential energy which applies pressure to mechanical beams 180. A mechanical vibration frequency of mechanical beams 180 may, in some cases, depend on a displacement of proof mass 50, the displacement due to an acceleration of accelerometer system 10. The mechanical vibration frequency of mechanical beams 180 may be reflected in the first modulated optical signal after the first modulated optical signal fully propagates through first DETF structure 54. As such, photoreceiver 24A of circuit 14 may receive the first modulated optical signal and circuit 14 may determine an acceleration value based on the mechanical vibration frequency of mechanical beams 180.

As seen in FIG. 5C, defect 198 is distal to tapered section 196. In some examples, defect 198 may be substantially midway between the tapered section proximal end 200 and the proximal end 192 of mechanical beams 180. In some examples, a width 210 of mechanical beam 180A may be within a range from 300 nm to 3,000 nm. In some examples, a width 212 of mechanical beam 180B may be within a range from 300 nm to 3,000 nm. Additionally, in some examples, a width 214 of gap 181 may be within a range from 100 nm to 1,000 nm.

Figure 6:
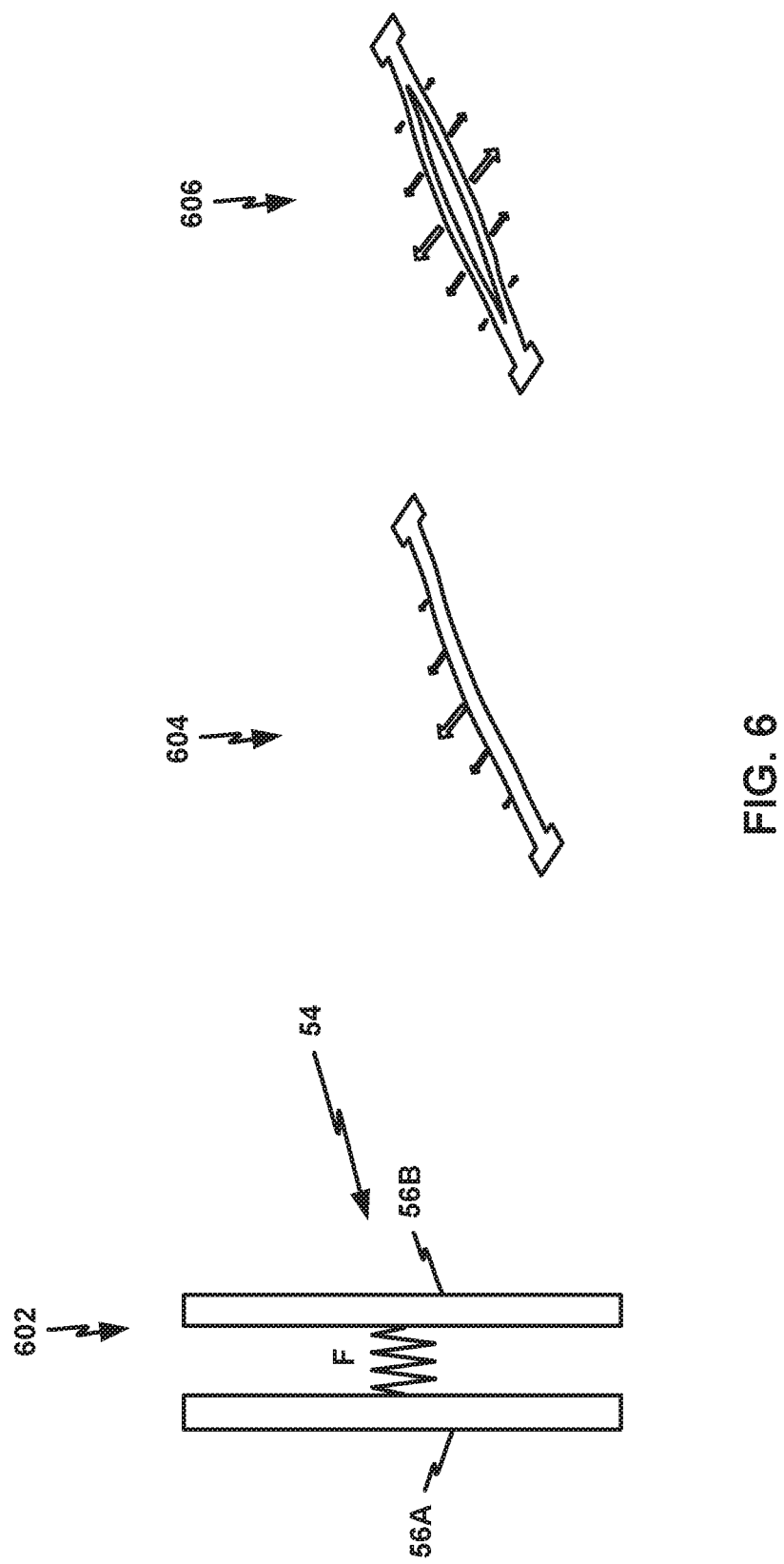
FIG. 6 depicts additional aspects of the accelerometer system of FIG. 1, in accordance with one or more techniques of this disclosure.

FIG. 6 depicts additional aspects of accelerometer system 10, in accordance with one or more techniques of this disclosure. For example, FIG. 6 illustrates the first DETF structure 54 including the first pair of mechanical beams 56. The optical signal emitted by light-emitting device 12 may induce a force between the first pair of mechanical beams 56, and the force may be modelled by a spring force. FIG. 6 illustrates a spring force provided by laser light between beams in an optical zipper in the gap between mechanical beams 56A, 56B of DETF structure 54 (602); a perspective view depiction of vibration modes in beams in an optical zipper in one common direction together (604); and a perspective view depiction of vibration modes in beams in an optical zipper in opposing directions of oscillation (606).

Figure 7:
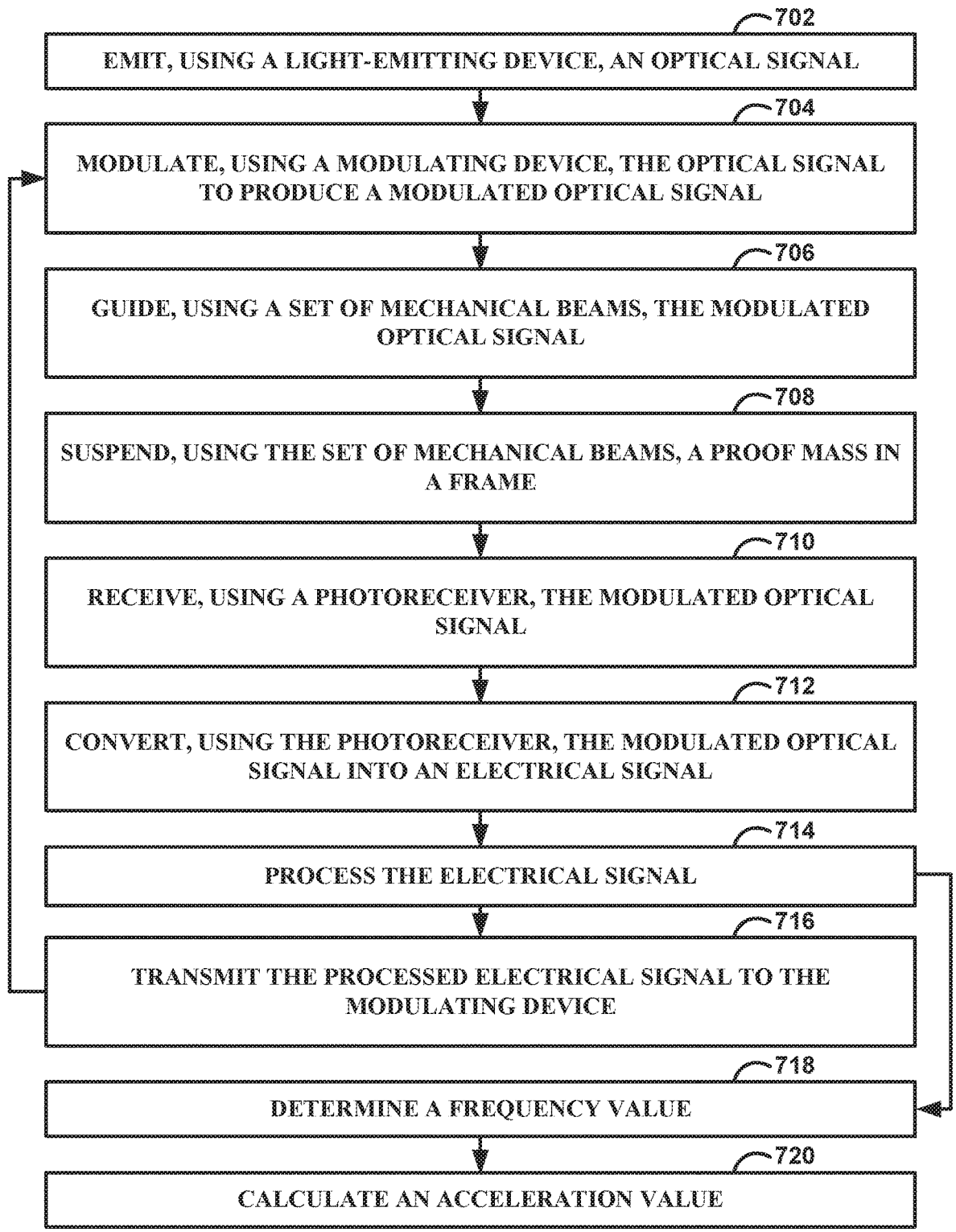
FIG. 7 is a flow diagram illustrating an example operation for determining a frequency value based on a mechanical vibrating frequency of a DETF structure having one or more corrugated edges, in accordance with one or more techniques of this disclosure.

FIG. 7 is a flow diagram illustrating an example operation for determining a frequency value based on a mechanical vibrating frequency of a DETF structure having one or more corrugated edges, in accordance with one or more techniques of this disclosure. For convenience, FIG. 7 is described with respect to light-emitting device 12, circuit 14, and proof mass assembly 16 of FIGS. 1-4. However, the techniques of FIG. 7 may be performed by different components of light-emitting device 12, circuit 14, and proof mass assembly 16 or by additional or alternative devices.

Accelerometer system 10, which includes light-emitting device 12, circuit 14, and proof mass assembly 16 is configured to, in some examples, measure an acceleration of an object in real-time or near real-time. In order to measure the acceleration, accelerometer system 10 is configured to measure a mechanical vibrating frequency of a DETF structure, the mechanical vibrating frequency being induced by an optical signal. An inertial navigation system may, in some examples, include accelerometer system 10. Based on the measured acceleration of an object over a period of time, the inertial navigation system may determine a position of the object over the period of time by performing a double integral of the acceleration over the period of time. In order to simplify the acceleration measurement, accelerometer system 10 may implement a positive feedback loop, as described with respect to the example operation of FIG. 7.

As illustrated in FIG. 7, light-emitting device 12 emits an optical signal (702). Light-emitting device 12 may, in some cases, include a laser device configured to emit photons. In some examples, light-emitting device 12 emits the photons at an optical power within a range between 0.1 microwatts (μW) and 10 μW. Light-emitting device 12 may transmit the optical signal to a modulating device of circuit 14, which modulates the optical signal (704). In some examples, the modulating device includes an electro-optic modulator, such as EOM 22A. In such examples, to modulate the optical signal, EOM 22A may increase an attenuation of the optical signal and decrease an attenuation of the optical signal for periods of time determined based on an electrical signal received by EOM 22A. After modulating the optical signal, the modulating device may, in some cases, transmit the modulated optical signal to proof mass assembly 16. Mechanical beams 56 of first DETF structure 54 guide the modulated optical signal (706) and mechanical beams 56 may suspend proof mass 50 in frame 52 (708). For example, the modulated optical signal may propagate through first DETF structure 54 of proof mass assembly 16, inducing a mechanical vibration in mechanical beams 56. In some examples, the induced mechanical vibration frequency affects properties of the modulated optical signal. For example, a mechanical vibration frequency of first DETF structure 54 may be reflected in the modulated optical signal after the modulated optical signal propagates through first DETF structure 54.

In some examples, mechanical beam 56A includes at least one of a first corrugated inner edge parallel to the longitudinal axis and a first corrugated outer edge parallel to the longitudinal axis. Additionally, in some examples, mechanical beam 56B includes at least one of a second corrugated inner edge parallel to the longitudinal axis and a second corrugated outer edge parallel to the longitudinal axis. The corrugated edges of mechanical beams 56 may, in some cases, cause an optical cavity to form in first gap 57 between mechanical beam 56A and mechanical beam 56B. In turn, the optical cavity may induce the mechanical vibration in mechanical beams 56.

A photoreceiver (e.g., photoreceiver 24A) receives the modulated optical signal (710) after the modulated optical signal travels through first DETF structure 54. Additionally, photoreceiver 24A converts the modulated optical signal into an electrical signal (712). Photoreceiver 24A may be a semiconductor device configured to receive photons and convert the photons into electrical energy. When photoreceiver 24A generates the electrical signal, photoreceiver 24A may preserve properties of the optical signal, such as frequencies or intensity levels. For example, the mechanical vibration frequency of first DETF structure 54, which is reflected in the modulated optical signal, may also be reflected in the electrical signal generated by photoreceiver 24A. Additionally, in some examples, an intensity of the modulated optical signal may be reflected in the electrical signal. For example, a greater intensity level of the modulated optical signal may correspond to a greater current amplitude of the electrical signal, and a lower intensity level of the modulated optical signal may correspond to a lower current amplitude of the electrical signal.

Circuit 14 processes the electrical signal (714) using feedback unit 26A. In some examples, to process the electrical signal, feedback unit 26A uses band pass filter 40A, phase shifter 42A, electronic amplifier 44A, and voltage limiter 46A. Feedback unit 26A transmits the processed electrical signal to the modulating device (716), and the operation returns to block 704. As such, the modulating device modulates the optical signal generated by light-emitting device 12 using the processed electrical signal, which is influenced by the mechanical vibrating frequency of first DETF structure 54. This modulation completes a positive feedback loop, in that the modulated optical signal is created by the modulating device based on the processed electrical signal, which in turn is created by circuit 14 based on the modulated optical circuit. Additionally, the mechanical vibration of the first DETF structure 54, which is induced by the modulated optical signal may be influenced by the mechanical vibration frequency of the first DETF structure 54 itself, since the mechanical vibration frequency may drive the electrical signal, which in turn drives the modulated optical signal.

Frequency counter 28A determines a frequency value based on the processed electrical signal (718). In some examples, the frequency value may represent the mechanical vibration frequency of the first DETF structure 54. Based on the frequency value, processing circuitry 30 is configured to calculate an acceleration value (720). In some examples, processing circuitry 30 may calculate the acceleration value by subtracting a baseline frequency value from the frequency value to obtain a frequency difference value, where the baseline frequency value represents a mechanical vibration frequency of the first DETF structure 54 while proof mass 50 is not displaced (i.e., while acceleration is equal to 0 m/s$^2$). The frequency difference value may, in some examples, be correlated with acceleration. Based on the correlation, processing circuitry 30 may calculate the acceleration value using the frequency difference value. In some examples, processing circuitry 30 is configured to track the acceleration value over a period of time as the displacement of proof mass 50 changes. Processing circuitry 30 may, in some cases, store the acceleration values over the period of time in a memory.

Although the example operation of FIG. 7 is described with respect to the first positive feedback loop including, among other things, EOM 22A, photoreceiver 24A, feedback unit 26A, frequency counter 28A, and first DETF structure 54, in some examples, the example operation of FIG. 7 may be performed using the second positive feedback loop including, among other things, EOM 22B, photoreceiver 24B, feedback unit 26B, frequency counter 28B, and second DETF structure 58.

Figure 8:
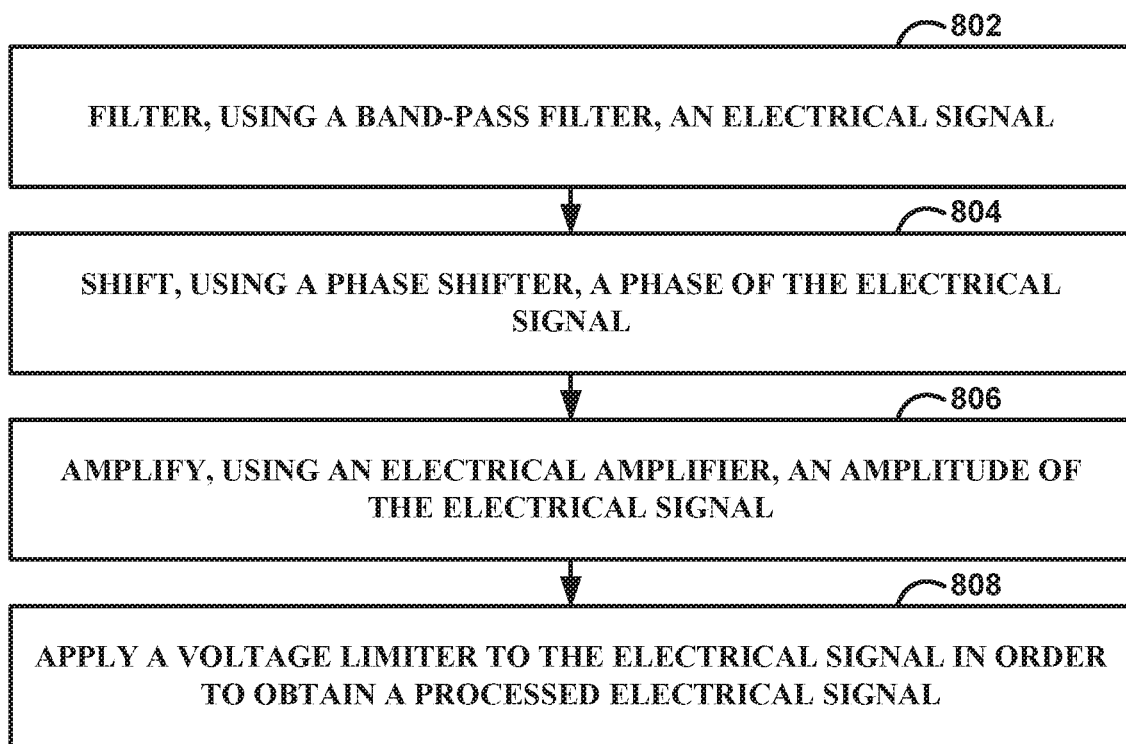
FIG. 8 is a flow diagram illustrating an example operation for processing an electrical signal, in accordance with one or more techniques of this disclosure.

FIG. 8 is a flow diagram illustrating an example operation for processing an electrical signal, in accordance with one or more techniques of this disclosure. For convenience, FIG. 8 is described with respect to light-emitting device 12, circuit 14, and proof mass assembly 16 of FIGS. 1-4. However, the techniques of FIG. 8 may be performed by different components of light-emitting device 12, circuit 14, and proof mass assembly 16 or by additional or alternative devices.

The example operation of FIG. 8 may represent an example operation to process the electrical signal (block 714 of FIG. 6). Band pass filter 40A filters the electrical signal (802) generated by 24A. Band pass filter 40A may be an electronic filter that attenuates frequencies outside of a frequency range and "passes" frequencies within the frequency range. Phase shifter 42A shifts a phase of the electrical signal (804). In some examples, phase shifter 42A may "delay" the electrical signal by a time value in order to shift a timeline in which frequency components of the electrical signal oscillate. Electronic Amplifier 44A amplifies an amplitude of the electrical signal (806). In other words, electronic amplifier 44A may increase a power of the electrical signal. Voltage limiter 46A limits the voltage of the electrical signal to obtain the processed electrical signal (808). In other words, voltage limiter 46A may prevent the electrical signal from exceeding the maximum voltage value, meaning that the processed electrical signal produced by feedback unit 26A may not exceed the maximum voltage value.

Although the example operation of FIG. 8 is described with respect to the first positive feedback loop including, among other things, band pass filter 40A, phase shifter 42A, electronic amplifier 44A, and voltage limiter 46A, in some examples, the example operation of FIG. 8 may be performed using the second positive feedback loop including, among other things, band pass filter 40B, phase shifter 42B, electronic amplifier 44B, and voltage limiter 46B.

Figure 9:
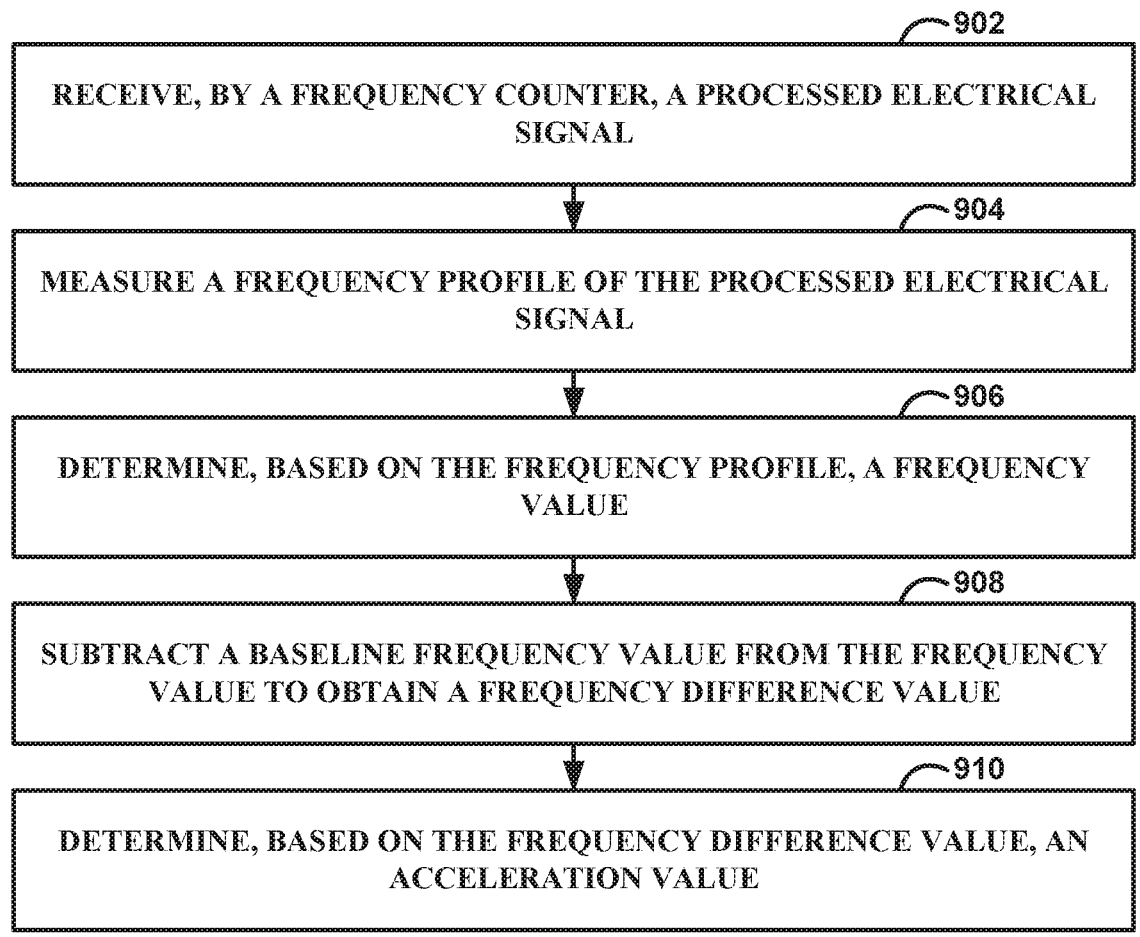
FIG. 9 is a flow diagram illustrating an example operation for calculating an acceleration value based on a frequency value measured by the accelerometer system of FIG. 1, in accordance with one or more techniques of this disclosure.

FIG. 9 is a flow diagram illustrating an example operation for calculating an acceleration value based on a frequency value measured by accelerometer system 10, in accordance with one or more techniques of this disclosure. For convenience, FIG. 9 is described with respect to light-emitting device 12, circuit 14, and proof mass assembly 16 of FIGS. 1-4. However, the techniques of FIG. 9 may be performed by different components of light-emitting device 12, circuit 14, and proof mass assembly 16 or by additional or alternative devices.

Frequency counter 28A receives a processed electrical signal (902). In some examples, the processed electrical signal may be processed, at least in part, by feedback unit 26A. After receiving the processed electrical signal, frequency counter 28A measures a frequency profile of the processed electrical signal (904) and determines, based on the frequency profile, a frequency value (906). In this way, frequency counter 28A may be configured to isolate the frequency value from the processed electrical signal, where the frequency value represents a mechanical vibrating frequency of first DETF structure 54. As the mechanical vibrating frequency of first DETF structure 54 changes, the frequency value may change commensurately, thus enabling accelerometer system 10 to identify changes in the mechanical vibrating frequency of first DETF structure 54 based on the processed electrical signal.

Processing circuitry 30 subtracts a baseline frequency value from the frequency value to obtain a frequency difference value (908). In some examples, the baseline frequency value represents a mechanical vibrating frequency of first DETF structure 54 when first DETF structure 54 is excited by an optical signal and proof mass 50 is not displaced along the proof mass displacement axis 72. When proof mass 50 is not displaced along the proof mass displacement axis 72, an acceleration of acelerometer system 10 may be zero. As such, the baseline frequency value may represent a mechanical vibration frequency of the first DETF structure 54 at zero acceleration. In some examples, the baseline frequency value may be within a range between 1 Megahertz (MHz) and 2 MHz. In some examples, the baseline frequency value is 1.33 MHz. Processing circuitry 30 determines, based on the frequency difference value, an acceleration value (910). Acceleration may, in some cases, have a linear relationship with the frequency difference value. In other words, a change in the frequency difference value may correspond to a commensurate change in acceleration.

Although the example operation of FIG. 9 is described with respect to the first positive feedback loop including, among other things, feedback unit 26A and frequency counter 28A, in some examples, the example operation of FIG. 9 may be performed using the second positive feedback loop including, among other things, feedback unit 26B and frequency counter 28B.

In one or more examples, the accelerometers described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

What is claimed is:

1. A system comprising:
a light-emitting device configured to emit an optical signal;
a circuit comprising a modulating device configured to modulate the optical signal to produce a modulated optical signal; and
a mechanical structure extending along a longitudinal axis, the mechanical structure comprising a set of mechanical beams,
wherein the set of mechanical beams are configured to guide the modulated optical signal,
wherein the set of mechanical beams includes a first mechanical beam and a second mechanical beam separated by a gap,
wherein the first mechanical beam comprises:
a first inner edge parallel to the longitudinal axis, wherein the first inner edge is located at a first end of the gap separating the first mechanical beam and the second mechanical beam; and
a first outer edge parallel to the longitudinal axis, wherein at least one of the first inner edge and the first outer edge forms a first oscillatory pattern,
wherein the first oscillatory pattern comprises a first sinusoid that includes a first one or more curves, and wherein the first oscillatory pattern comprises a first defect that represents a discontinuity in the first oscillatory pattern, and
wherein the second mechanical beam comprises:
a second inner edge parallel to the longitudinal axis, wherein the second inner edge is located at a second end of the gap separating the first mechanical beam and the second mechanical beam; and
a second outer edge parallel to the longitudinal axis, wherein at least one of the second inner edge and the second outer edge forms a second oscillatory pattern, wherein the second oscillatory pattern comprises a second sinusoid that includes a second one or more curves, wherein the second oscillatory pattern comprises a second defect that represents a discontinuity in the second oscillatory pattern, and wherein the second defect and the first defect are located at the same point along the longitudinal axis.

2. The system of claim 1, wherein the system further comprises a proof mass, wherein the mechanical structure is configured to suspend the proof mass in a frame, and wherein the circuit is further configured to:
determine an acceleration value based on the modulated optical signal guided by the set of mechanical beams, wherein the modulated optical signal is correlated with a displacement of the proof mass along the longitudinal axis relative to the frame.

3. The system of claim 1, wherein the first inner edge comprises a first corrugated inner edge that forms the first oscillatory pattern, wherein the first outer edge comprises a first straight outer edge, wherein the second inner edge comprises a second corrugated inner edge that forms the second oscillatory pattern, and wherein the second outer edge comprises a first second straight outer edge.

4. The system of claim 1, wherein the first inner edge comprises a first straight inner edge, wherein the first outer edge comprises a first corrugated outer edge that forms the first oscillatory pattern, wherein the second inner edge comprises a second straight inner edge, and wherein the second outer edge comprises a second corrugated outer edge that forms the second oscillatory pattern.

5. The system of claim 1, wherein the first inner edge comprises a first corrugated inner edge that forms the first oscillatory pattern, wherein the first outer edge comprises a first corrugated outer edge that forms a third oscillatory pattern, wherein the second inner edge comprises a second corrugated inner edge that forms the second oscillatory pattern, and wherein the second outer edge comprises a second corrugated outer edge that forms a fourth oscillatory pattern.

6. The system of claim 1, wherein a width of the first mechanical beam is within a range from 300 nanometers (nm) and 3,000 nm, wherein a width of the second mechanical beam is within a range from 300 nm to 3,000 nm, and wherein a width of the gap is within a range from 100 nm to 1,000 nm.

7. The system of claim 1, wherein the first outer edge comprises a first corrugated outer edge that forms the first oscillatory pattern, wherein an amplitude of the first oscillatory pattern increases from a first outer amplitude value to a second outer amplitude value across a first portion of the first mechanical beam,
wherein the second outer edge comprises a second corrugated outer edge that forms the second oscillatory pattern, wherein an amplitude of the second oscillatory pattern increases from the first outer amplitude value to the second outer amplitude value across a first portion of the second mechanical beam, and
wherein wherein the first defect and the second defect introduce an optical cavity in the gap.

8. The system of claim 1, wherein the first inner edge comprises a first corrugated inner edge that forms the first oscillatory pattern, wherein an amplitude of the first oscillatory pattern increases from a first inner amplitude value to a second inner amplitude value across a first portion of the first mechanical beam,
wherein the second inner edge comprises a second corrugated inner edge that forms the second oscillatory pattern, wherein an amplitude of the second oscillatory pattern increases from the first inner amplitude value to the second inner amplitude value across a first portion of the second mechanical beam, and
wherein the first defect and the second defect introduce an optical cavity in the gap.

9. The system of claim 2, wherein the modulating device is a first modulating device, the modulated optical signal is a first modulated optical signal, the mechanical structure is a first mechanical structure, the set of mechanical beams is a first set of mechanical beams, the gap is a first gap, and the acceleration value is a first acceleration value, wherein the circuit further comprises:
a second modulating device configured to modulate the optical signal to obtain a second modulated optical signal, wherein the system further comprises:
a second mechanical structure extending along the longitudinal axis, the second mechanical structure comprising a second set of mechanical beams,
wherein the second set of mechanical beams are configured to suspend the proof mass in the frame and to guide the second modulated optical signal,
wherein the second set of mechanical beams includes a third mechanical beam and a fourth mechanical beam separated by a second gap,
wherein the third mechanical beam comprises:
a third inner edge parallel to the longitudinal axis, wherein the third inner edge is located at a first end of the second gap separating the third mechanical beam and the fourth mechanical beam; and
a third outer edge parallel to the longitudinal axis,
wherein at least one of the third inner edge and third outer edge forms a third oscillatory pattern,
wherein the third oscillatory pattern comprises a third sinusoid that includes a third one or more curves, and wherein the third oscillatory pattern comprises a third defect that represents a discontinuity in the third oscillatory pattern,
wherein the fourth mechanical beam comprises:
a fourth inner edge parallel to the longitudinal axis, wherein the fourth inner edge is located at a second end of the second gap separating the third mechanical beam and the fourth mechanical beam; and
a fourth outer edge parallel to the longitudinal axis,
wherein at least one of the fourth inner edge and fourth outer edge forms a fourth oscillatory pattern, wherein the fourth oscillatory pattern comprises a fourth sinusoid that includes a fourth one or more curves, wherein the fourth oscillatory pattern comprises a fourth defect that represents a discontinuity in the fourth oscillatory pattern, and wherein the third defect and the fourth defect are located at the same point along the longitudinal axis, and wherein the circuit is further configured to:
determine a second acceleration value based on the second modulated optical signal guided by the second set of mechanical beams, wherein the second modulated optical signal is correlated with the displacement of the proof mass along the longitudinal axis relative to the frame.

10. The system of claim 9, wherein to determine the first acceleration value based on the first modulated optical signal, the circuit is further configured to:
receive, using a first photoreceiver, the first modulated optical signal;
convert, using the first photoreceiver, the first modulated optical signal into a first electrical signal;
process the first electrical signal to obtain a first processed electrical signal;
transmit the first processed electrical signal to the first modulating device, wherein the first modulating device is configured to modulate the optical signal based on the first processed electrical signal; and
determine, based on the first processed electrical signal, the first acceleration value, wherein to determine the second acceleration value based on the second modulated optical signal, the circuit is further configured to:
receive, using a second photoreceiver, the second modulated optical signal;
convert, using the second photoreceiver, the second modulated optical signal into a second electrical signal;
process the second electrical signal to obtain a second processed electrical signal;

transmit the second processed electrical signal to the second modulating device, wherein the second modulating device is configured to modulate the optical signal based on the second processed electrical signal; and determine, based on the second processed electrical signal, the second acceleration value, and wherein the circuit is further configured to:

determine, based on the first acceleration value and the second acceleration value, a third acceleration value indicative of a present acceleration of the system.

11. The system of claim 10, wherein the third acceleration value is up to 500,000 meters per second squared (m/s²).

12. A mechanical assembly comprising:

a mechanical structure extending along a longitudinal axis, the mechanical structure comprising a set of mechanical beams, wherein the set of mechanical beams are configured to guide a modulated optical signal, wherein a circuit comprises a modulating device configured to modulate an optical signal to produce the modulated optical signal, the optical signal emitted by a light-emitting device, wherein the set of mechanical beams includes a first mechanical beam and a second mechanical beam separated by a gap, wherein the first mechanical beam comprises:

a first inner edge parallel to the longitudinal axis, wherein the first inner edge is located at a first end of the gap separating the first mechanical beam and the second mechanical beam; and a first outer edge parallel to the longitudinal axis, wherein at least one of the first inner edge and the first outer edge forms a first oscillatory pattern, wherein the first oscillatory pattern comprises a first sinusoid that includes a first one or more curves, and wherein the first oscillatory pattern comprises a first defect that represents a discontinuity in the first oscillatory pattern, and wherein the second mechanical beam comprises:

a second inner edge parallel to the longitudinal axis, wherein the second inner edge is located at a second end of the gap separating the first mechanical beam and the second mechanical beam; and a second outer edge parallel to the longitudinal axis, wherein at least one of the second inner edge and the second outer edge forms a second oscillatory pattern, wherein the second oscillatory pattern comprises a second sinusoid that includes a second one or more curves, wherein the second oscillatory pattern comprises a second defect that represents a discontinuity in the second oscillatory pattern, and wherein the second defect and the first defect are located at the same point along the longitudinal axis.

13. The mechanical assembly of claim 12, wherein the first inner edge comprises a first corrugated inner edge that forms the first oscillatory pattern, wherein the first outer edge comprises a first straight outer edge, and wherein the second inner edge comprises a second corrugated inner edge that forms the second oscillatory pattern, and wherein the second outer edge comprises a second straight outer edge.

14. The mechanical assembly of claim 12, wherein the first inner edge comprises a first straight inner edge, wherein the first outer edge comprises a first corrugated outer edge that forms the first oscillatory pattern, wherein the second inner edge comprises a second straight inner edge, and wherein the second outer edge comprises a second corrugated outer edge that forms the second oscillatory pattern.

15. The mechanical assembly of claim 12, wherein the first inner edge comprises a first corrugated inner edge that forms the first oscillatory pattern, wherein the first outer edge comprises a first corrugated outer edge that forms third oscillatory pattern, wherein the second inner edge comprises a second corrugated inner edge that forms the second oscillatory pattern, and wherein the second outer edge comprises a second corrugated outer edge that forms a fourth oscillatory pattern.

16. The mechanical assembly of claim 12, wherein a width of the first mechanical beam is within a range from 300 nanometers (nm) and 3,000 nm, wherein a width of the second mechanical beam is within a range from 300 nm to 3,000 nm, and wherein a width of the gap is within a range from 100 nm to 1,000 nm.

17. The mechanical assembly of claim 12, wherein the first outer edge comprises a first corrugated outer edge that forms the first oscillatory pattern, wherein an amplitude of the first outer oscillatory pattern increases from a first outer amplitude value to a second outer amplitude value across a first portion of the first mechanical beam, wherein the second outer edge comprises a second corrugated outer edge that forms the second oscillatory pattern, wherein an amplitude of the second outer oscillatory pattern increases from the first outer amplitude value to the second outer amplitude value across a first portion of the second mechanical beam, and wherein wherein the first defect and the second defect introduce an optical cavity in the gap.

18. The mechanical assembly of claim 12, wherein the first inner edge comprises a first corrugated inner edge that forms the first oscillatory pattern, wherein an amplitude of the first oscillatory pattern increases from a first inner amplitude value to a second inner amplitude value across a first portion of the first mechanical beam, wherein the second inner edge comprises a second corrugated inner edge that forms the second inner oscillatory pattern, wherein an amplitude of the second oscillatory pattern increases from the first inner amplitude value to the second inner amplitude value across a first portion of the second mechanical beam, and wherein the first defect and the second defect introduce an optical cavity in the gap.

19. The mechanical assembly of claim 12, wherein the modulating device is a first modulating device, the modulated optical signal is a first modulated optical signal, the mechanical structure is a first mechanical structure, the set of mechanical beams is a first set of mechanical beams, and the gap is a first gap, wherein the mechanical assembly further comprises:

a second mechanical structure extending along the longitudinal axis, the second mechanical structure comprising a second set of mechanical beams, wherein the second set of mechanical beams are configured to guide a second modulated optical signal, wherein the circuit comprises a second modulating device configured to modulate the optical signal to produce the second modulated optical signal, wherein the third mechanical beam comprises:

a third inner edge parallel to the longitudinal axis, wherein the third inner edge is located at a first end of the second gap separating the third mechanical beam and the fourth mechanical beam; and a third outer edge parallel to the longitudinal axis, wherein at least one of the third inner edge and third outer edge forms a third oscillatory pattern,
wherein the first oscillatory pattern comprises a third sinusoid that includes a third one or more curves, and wherein the third oscillatory pattern comprises a third defect that represents a discontinuity in the third oscillatory pattern,
wherein the fourth mechanical beam comprises:
  a fourth inner edge parallel to the longitudinal axis, wherein the fourth inner edge is located at a second end of the second gap separating the third mechanical beam and the fourth mechanical beam; and
  a fourth outer edge parallel to the longitudinal axis,
  wherein at least one of the fourth inner edge and fourth outer edge forms a fourth oscillatory pattern, wherein the fourth oscillatory pattern comprises a fourth sinusoid that includes a fourth one or more curves, wherein the fourth oscillatory pattern comprises a fourth defect that represents a discontinuity in the fourth oscillatory pattern, and wherein the third defect and the fourth defect are located at the same point along the longitudinal axis.

20. A method comprising:
emitting, using a light-emitting device, an optical signal;
modulating, using a modulating device of a circuit, the optical signal to produce a modulated optical signal; and
guiding, using a set of mechanical beams of a mechanical structure extending along a longitudinal axis, the modulated optical signal,
wherein the set of mechanical beams includes a first mechanical beam and a second mechanical beam separated by a gap,
wherein the first mechanical beam comprises:
  a first inner edge parallel to the longitudinal axis, wherein the first inner edge is located at a first end of the gap separating the first mechanical beam and the second mechanical beam; and
  a first outer edge parallel to the longitudinal axis,
  wherein at least one of the first inner edge and the first outer edge forms a first oscillatory pattern,
  wherein the first oscillatory pattern comprises a first sinusoid that includes a first one or more curves, and wherein the first oscillatory pattern comprises a first defect that represents a discontinuity in the first oscillatory pattern, and
wherein the second mechanical beam comprises:
  a second inner edge parallel to the longitudinal axis, wherein the second inner edge is located at a second end of the gap separating the first mechanical beam and the second mechanical beam; and
  a second outer edge parallel to the longitudinal axis,
  wherein at least one of the second inner edge and the second outer edge forms a second oscillatory pattern, wherein the second oscillatory pattern comprises a second sinusoid that includes a second one or more curves, wherein the second oscillatory pattern comprises a second defect that represents a discontinuity in the second oscillatory pattern, and wherein the second defect and the first defect are located at the same point along the longitudinal axis.

\* \* \* \* \*